United States Patent
Hoffman et al.

(10) Patent No.: US 9,343,930 B2
(45) Date of Patent: May 17, 2016

(54) SEGMENTED STATOR ASSEMBLY

(71) Applicant: Baldor Electric Company, Fort Smith, AR (US)

(72) Inventors: Matthew D. Hoffman, Siloam Springs, AR (US); Robert J. Mantey, Fayetteville, AR (US); Douglas H. Sudhoff, Van Buren, AR (US); Lorenzo Mazza, Fort Smith, AR (US); Bryan L. Paxton, Van Buren, AR (US); Jeffrey L. Davis, Fort Smith, AR (US); Daniel Scott Dorsch, Fort Smith, AR (US)

(73) Assignee: Baldor Electric Company, Fort Smith, AR (US)

( * ) Notice: Subject to any disclaimer, the term of this patent is extended or adjusted under 35 U.S.C. 154(b) by 239 days.

(21) Appl. No.: 13/894,974

(22) Filed: May 15, 2013

(65) Prior Publication Data

US 2013/0313921 A1    Nov. 28, 2013

Related U.S. Application Data

(60) Provisional application No. 61/651,650, filed on May 25, 2012.

(51) Int. Cl.
*H02K 1/18* (2006.01)
*H02K 3/38* (2006.01)
(Continued)

(52) U.S. Cl.
CPC ............... *H02K 1/18* (2013.01); *H02K 1/148* (2013.01); *H02K 1/185* (2013.01); *H02K 3/34* (2013.01); *H02K 3/38* (2013.01); *H02K 3/522* (2013.01)

(58) Field of Classification Search
CPC ......... H02K 1/18; H02K 1/182; H02K 1/185; H02K 3/345; H02K 3/34; H02K 3/48; H02K 1/06; H02K 1/148; H02K 3/38; H02K 3/522
USPC ............. 310/214, 215, 71, 216.009, 216.105, 310/216.129, 216.132, 260, 259, 400, 43, 310/49.13, 49.15
See application file for complete search history.

(56) References Cited

U.S. PATENT DOCUMENTS 4,432,135 A * 2/1984 Greenlee .................... 29/598
5,350,960 A   9/1994 Kiri et al.
(Continued)

FOREIGN PATENT DOCUMENTS

DE   102008023923 A1   1/2009
EP         140400 A1   5/1985
(Continued)

*Primary Examiner* — Terrance Kenerly
*Assistant Examiner* — Alexander Singh
(74) *Attorney, Agent, or Firm* — Thompson Coburn LLP

(57) ABSTRACT

A stator has a plurality of segments connected with connectors to define a core for the stator. Each of the segments comprises a plurality of laminations arranged side by side forming a lamination stack with axially opposite sides. The lamination stack has an end cap abutting an axial side of the lamination stack. The end cap has first and second posts extending axially therefrom. At least one of the posts defines a wire path for wire wound around the stack. Each of the connectors comprises a bridge portion. The bridge portion has openings dimensioned to receive the posts in a manner that the connector is removably attachable to the post of the end cap of a segment and the post of the end cap of an adjacent segment. The connector has an insulator portion projecting from the bridge portion. The insulator portion extends between adjacent segments.

29 Claims, 25 Drawing Sheets

(51) Int. Cl.
*H02K 3/34* (2006.01)
*H02K 1/14* (2006.01)
*H02K 3/52* (2006.01)

(56) References Cited

U.S. PATENT DOCUMENTS

| | | | |
|---|---|---|---|
| 5,359,249 A | 10/1994 | Tanaka | |
| 5,583,387 A | 12/1996 | Takeuchi et al. | |
| 5,698,923 A | 12/1997 | Scherzinger et al. | |
| 5,729,072 A | 3/1998 | Hirano et al. | |
| 5,786,651 A | 7/1998 | Suzuki | |
| 6,023,119 A | 2/2000 | Asao | |
| 6,127,753 A | 10/2000 | Yamazaki et al. | |
| D445,762 S | 7/2001 | Shida et al. | |
| 6,300,695 B1 | 10/2001 | Neal | |
| 6,362,554 B1 | 3/2002 | Neal | |
| 6,437,464 B1 | 8/2002 | Neal | |
| 6,487,769 B2 | 12/2002 | Ketterer et al. | |
| 6,495,941 B1 | 12/2002 | Nishimura | |
| 6,617,721 B1 | 9/2003 | Neal | |
| 6,737,785 B2 | 5/2004 | De Luca et al. | |
| 6,744,166 B2 | 6/2004 | Harter et al. | |
| 6,753,628 B1 | 6/2004 | Neal | |
| 6,844,636 B2 | 1/2005 | Lieu et al. | |
| 6,856,055 B2 | 2/2005 | Michaels et al. | |
| 6,856,064 B2 | 2/2005 | Masumoto et al. | |
| 6,882,080 B2 | 4/2005 | Tanaka et al. | |
| 6,892,439 B1 | 5/2005 | Neal et al. | |
| 6,911,166 B2 | 6/2005 | Neal | |
| 6,914,356 B2 | 7/2005 | Yamamura et al. | |
| 6,924,570 B2 | 8/2005 | De Filippis et al. | |
| 6,941,638 B2 | 9/2005 | Hartsfield, Jr. et al. | |
| 6,946,769 B2 * | 9/2005 | Yamamura et al. | 310/216.015 |
| 6,984,913 B2 | 1/2006 | Neuenschwander | |
| 7,012,350 B2 | 3/2006 | Peachee et al. | |
| 7,019,422 B2 | 3/2006 | Neal et al. | |
| 7,019,433 B2 | 3/2006 | Hashimoto et al. | |
| 7,026,734 B2 | 4/2006 | Braun | |
| 7,036,207 B2 | 5/2006 | Neal | |
| 7,049,715 B2 | 5/2006 | Neal | |
| 7,067,944 B2 | 6/2006 | Lieu et al. | |
| 7,067,952 B2 | 6/2006 | Neal | |
| 7,111,380 B2 | 9/2006 | Sheeran et al. | |
| 7,116,023 B2 | 10/2006 | Wang et al. | |
| 7,154,200 B2 | 12/2006 | Neal | |
| D539,219 S | 3/2007 | Wang et al. | |
| D539,737 S | 4/2007 | Wang et al. | |
| 7,239,059 B2 | 7/2007 | Maeda et al. | |
| 7,262,527 B2 | 8/2007 | Neal | |
| 7,262,534 B2 | 8/2007 | Baba et al. | |
| 7,291,955 B2 | 11/2007 | Otsuji | |
| 7,345,397 B2 | 3/2008 | Sheeran et al. | |
| 7,414,347 B2 | 8/2008 | Wang et al. | |
| 7,471,025 B2 | 12/2008 | Sheeran et al. | |
| 7,479,725 B2 | 1/2009 | Welke et al. | |
| 7,514,828 B2 | 4/2009 | Vollmuth et al. | |
| 7,566,999 B2 | 7/2009 | Neal | |
| 7,578,047 B2 | 8/2009 | Wang et al. | |
| 7,583,002 B2 | 9/2009 | Lyle et al. | |
| 7,586,231 B2 | 9/2009 | Wang et al. | |
| 7,598,637 B2 | 10/2009 | Niehaus et al. | |
| 7,626,304 B2 | 12/2009 | Morioka et al. | |
| 7,629,716 B2 | 12/2009 | Neal | |
| 7,683,509 B2 | 3/2010 | Neal | |
| 7,732,968 B2 * | 6/2010 | Zimmer et al. | 310/194 |
| 7,928,348 B2 | 4/2011 | Neal | |
| 7,960,889 B2 | 6/2011 | Yamamoto | |
| 8,008,832 B2 | 8/2011 | Rhode | |
| 8,018,115 B2 | 9/2011 | Lyle | |
| 8,093,779 B2 | 1/2012 | Hiramatsu et al. | |
| 8,400,041 B2 * | 3/2013 | Modi et al. | 310/194 |
| 2004/0051417 A1 | 3/2004 | Yamazaki et al. | |
| 2004/0251752 A1 * | 12/2004 | Shinzaki et al. | 310/71 |
| 2006/0071569 A1 | 4/2006 | Stewart et al. | |
| 2008/0191562 A1 * | 8/2008 | Kojima | H02K 21/24 310/43 |
| 2009/0134736 A1 | 5/2009 | Yamamoto et al. | |
| 2009/0134739 A1 | 5/2009 | Akita | |
| 2009/0134742 A1 * | 5/2009 | Rhode | 310/218 |
| 2009/0200891 A1 | 8/2009 | Du et al. | |
| 2009/0256430 A1 | 10/2009 | Farnia | |
| 2009/0289520 A1 * | 11/2009 | Takeshita et al. | 310/214 |
| 2009/0289521 A1 | 11/2009 | Yoshino et al. | |
| 2010/0213788 A1 | 8/2010 | Guttenberger et al. | |
| 2012/0098380 A1 | 4/2012 | Wang et al. | |

FOREIGN PATENT DOCUMENTS

| | | |
|---|---|---|
| EP | 1517426 A1 | 3/2005 |
| EP | 2040351 A2 | 3/2009 |
| WO | 2009060600 A1 | 5/2009 |
| WO | 2009084151 A1 | 7/2009 |
| WO | 2009084245 A1 | 7/2009 |
| WO | 2009093345 A1 | 7/2009 |
| WO | 2009139067 A1 | 11/2009 |
| WO | 2010010599 A1 | 1/2010 |
| WO | 2010016106 A1 | 2/2010 |
| WO | 2010026623 A1 | 3/2010 |
| WO | 2011010281 A1 | 1/2011 |

* cited by examiner

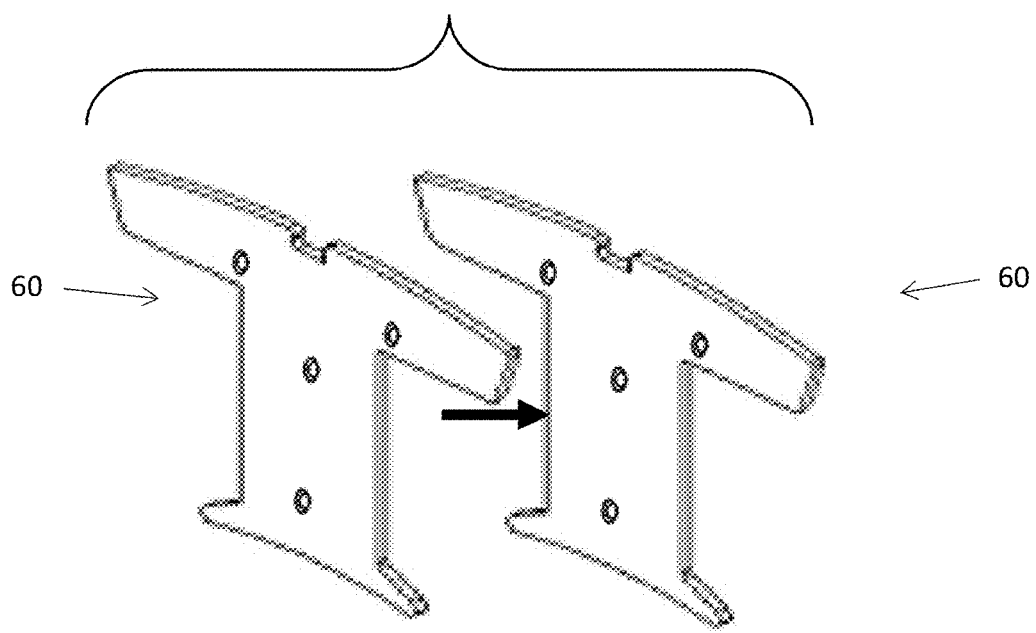
Fig. 2
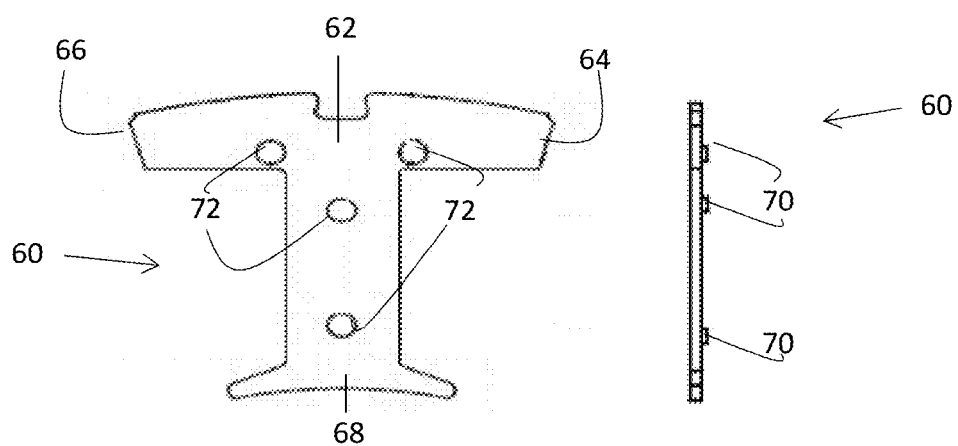
Fig. 3
Fig. 4

SEGMENTED STATOR ASSEMBLY

CROSS-REFERENCE TO RELATED APPLICATIONS

This application claims the benefit of provisional application Ser. No. 61/651,650, filed May 25, 2012, the disclosure of which is incorporated by reference herein.

BACKGROUND

An electric device, such as a motor or generator, has a stator secured within a housing. A rotor mounted on a shaft is coaxially positioned within the stator and is rotatable relative to the stator about a longitudinal axis of the shaft. The passage of current through windings mounted with respect to the stator creates a magnetic field tending to rotate the rotor and shaft. Concentrated windings may be formed on individual stator segments, which are then mounted with respect to each other to form a generally annular stator assembly.

DESCRIPTION OF THE DRAWINGS

FIG. 2 shows an exploded view of two like laminations prior to assembly in a side by side configuration to form one of the exemplary segments described herein, for instance, a segment for the stator of FIG. 1;

FIG. 3 shows a plan view of a lamination used to form one of the exemplary segments described herein;

FIG. 4 shows a side view of the lamination of FIG. 3;

DETAILED DESCRIPTION

Figure 1:
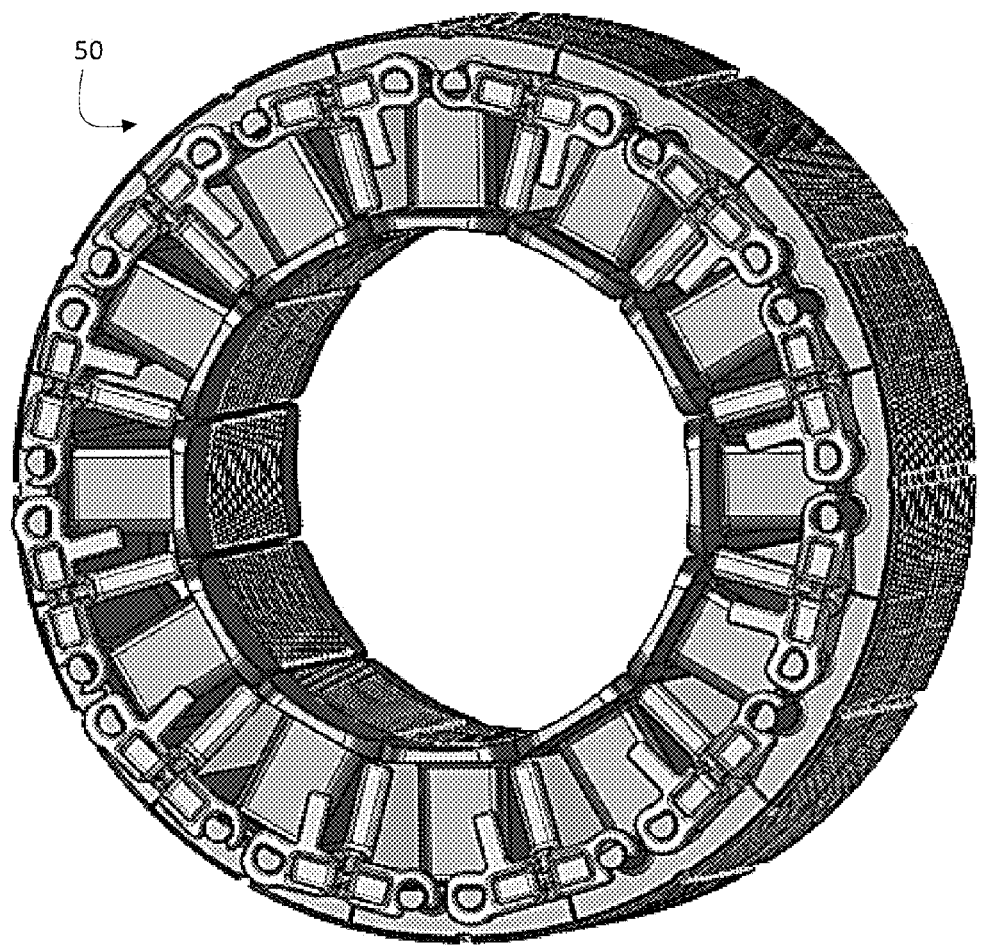
FIG. 1 shows a perspective view of a stator formed from a plurality of segments.
Figure 5:
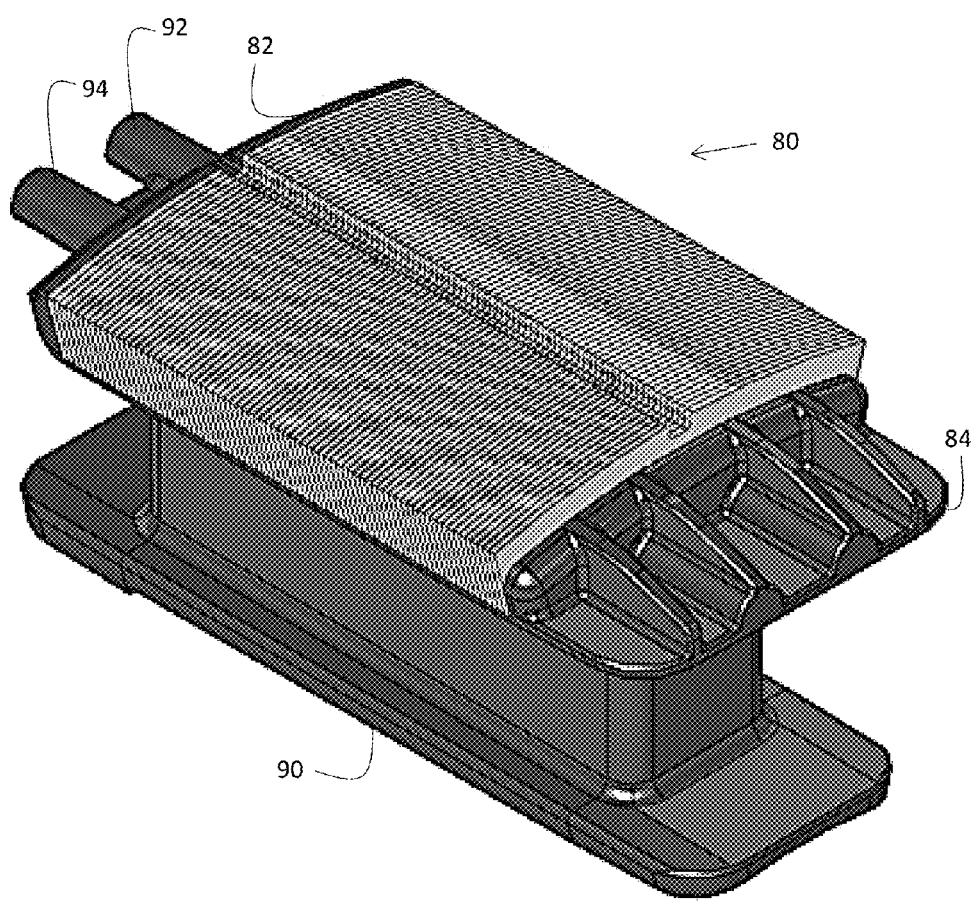
FIG. 5 shows a perspective view of a segment used to form the stator of FIG. 1.
Figure 6:
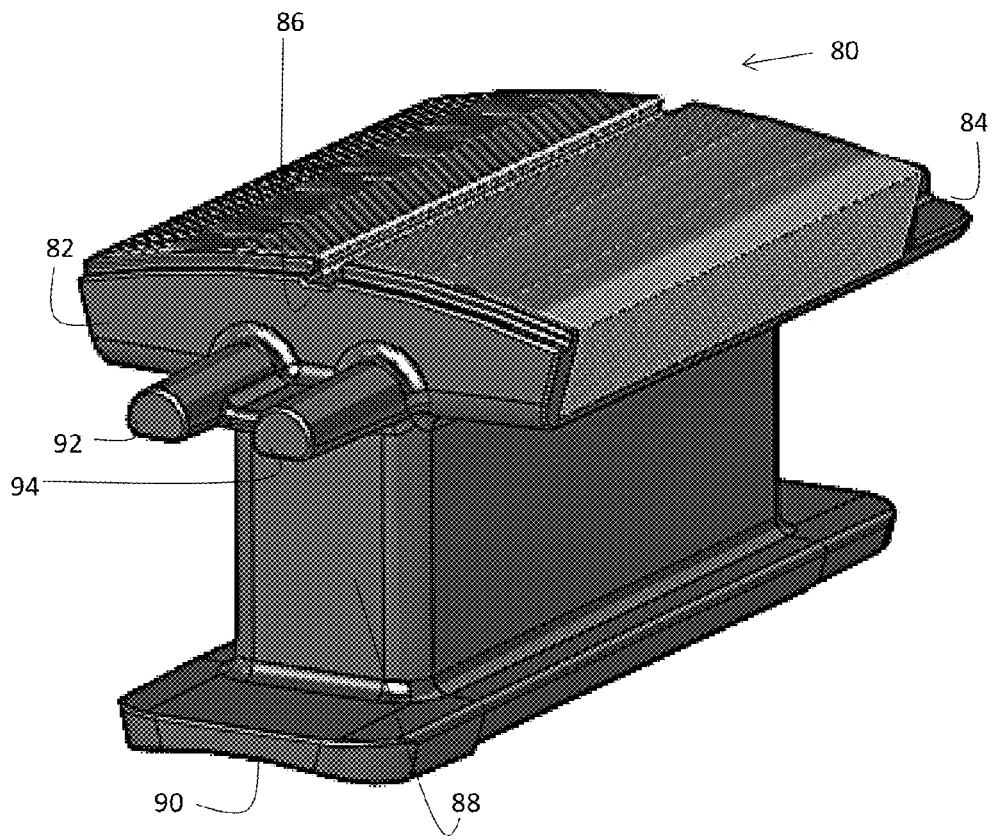
FIG. 6 shows an alternate perspective view of the stator segment of FIG. 1.
Figure 7:
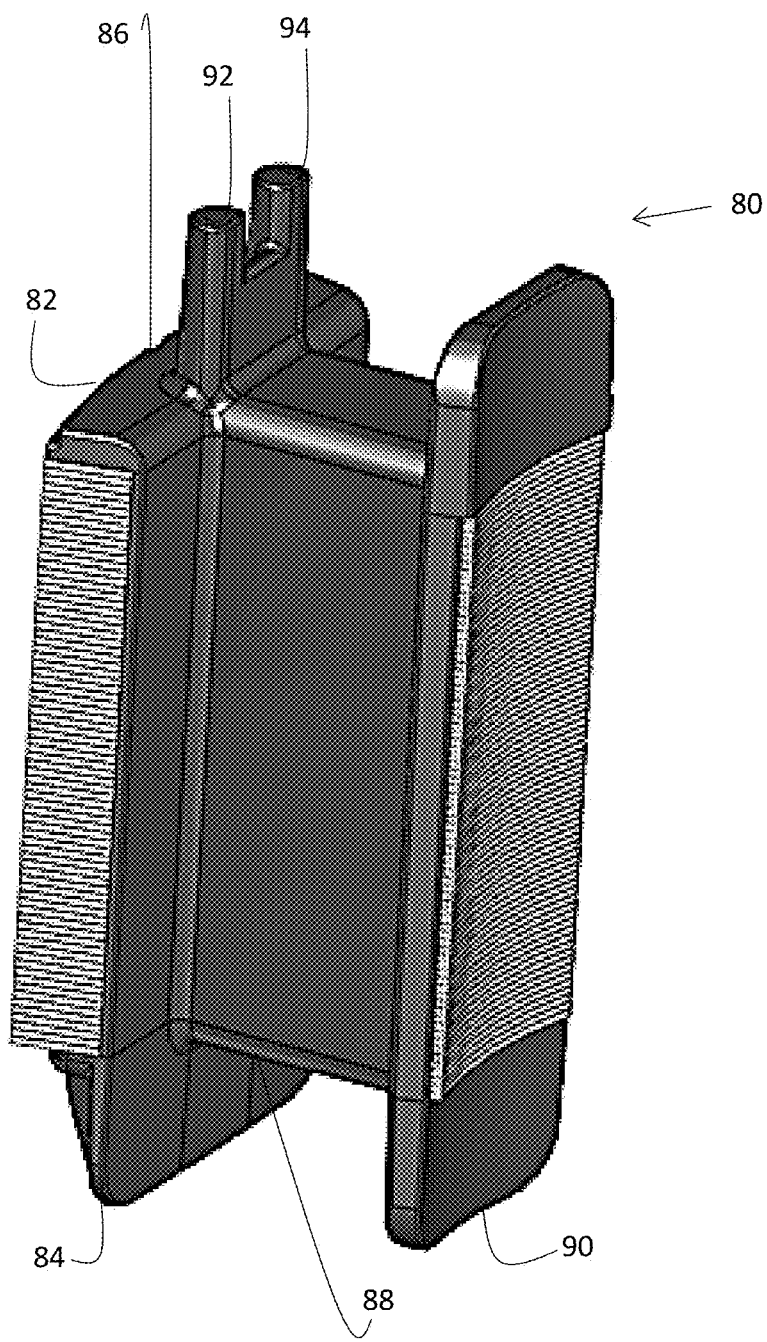
FIG. 7 shows an alternate perspective view of the stator segment of FIG. 1.
Figure 8:
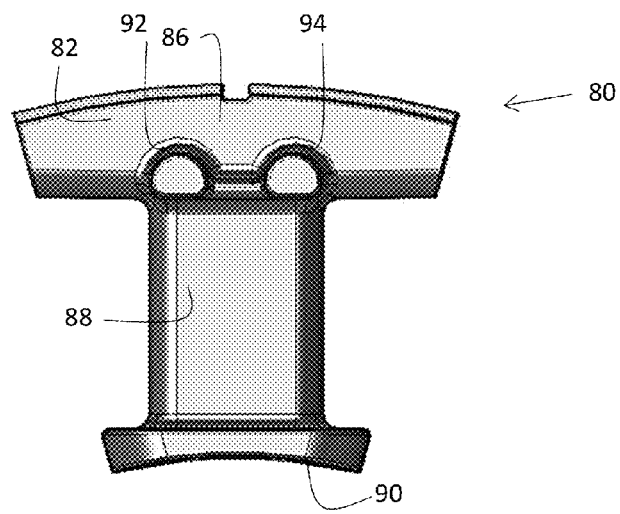
FIG. 8 shows an axial end view of the stator segment of FIG. 1.
Figure 9:
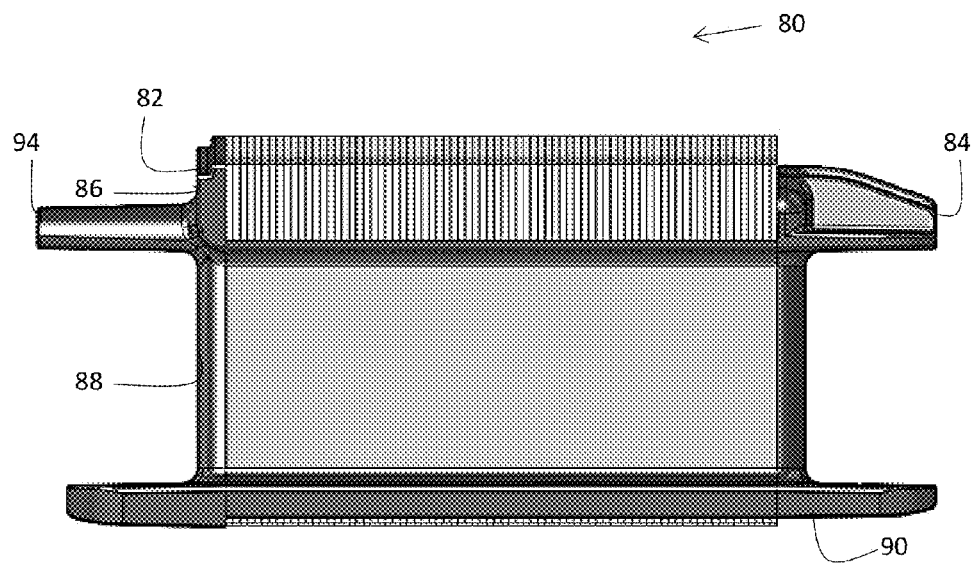
FIG. 9 shows a side view of the stator segment of FIG. 1.
Figure 10:
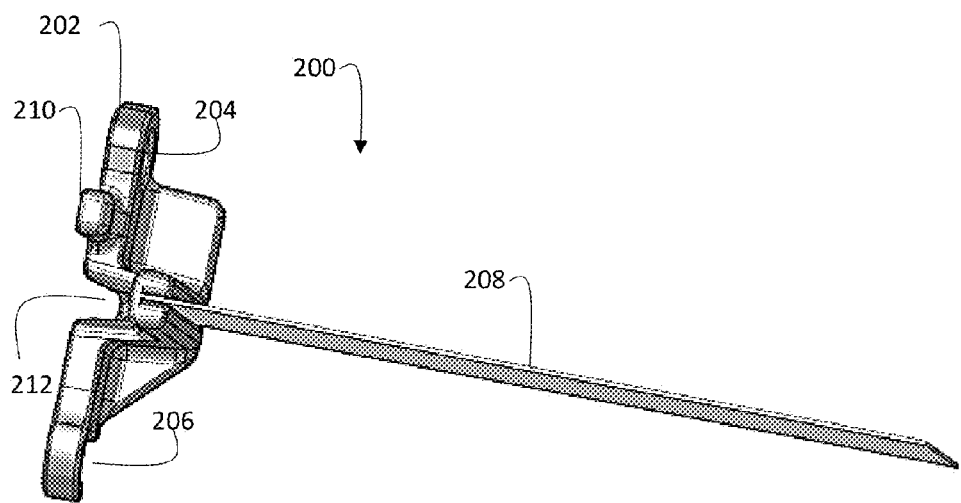
FIG. 10 shows a perspective view of a connector for the stator assembly of FIG. 1.
Figure 11:
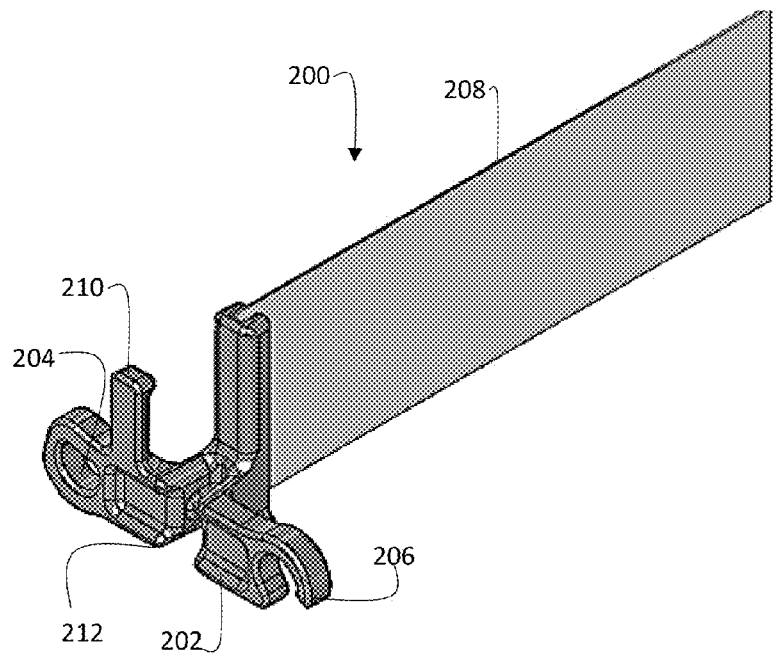
FIG. 11 shows an alternate perspective view of the connector of FIG. 10.
Figure 12:
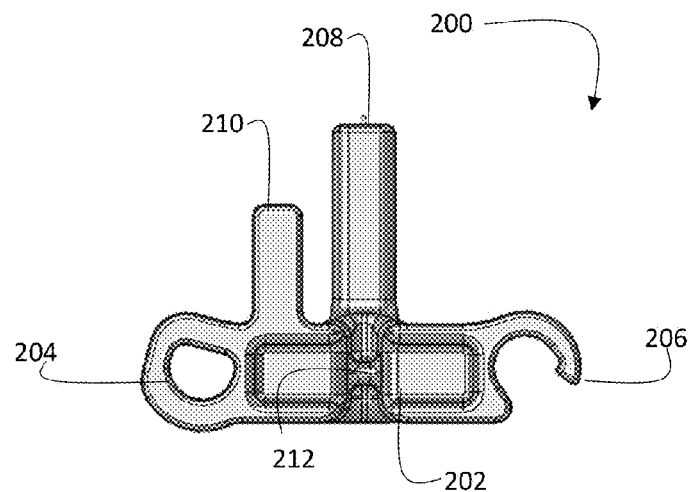
FIG. 12 shows an axial end view of the connector of FIG. 10.
Figure 13:
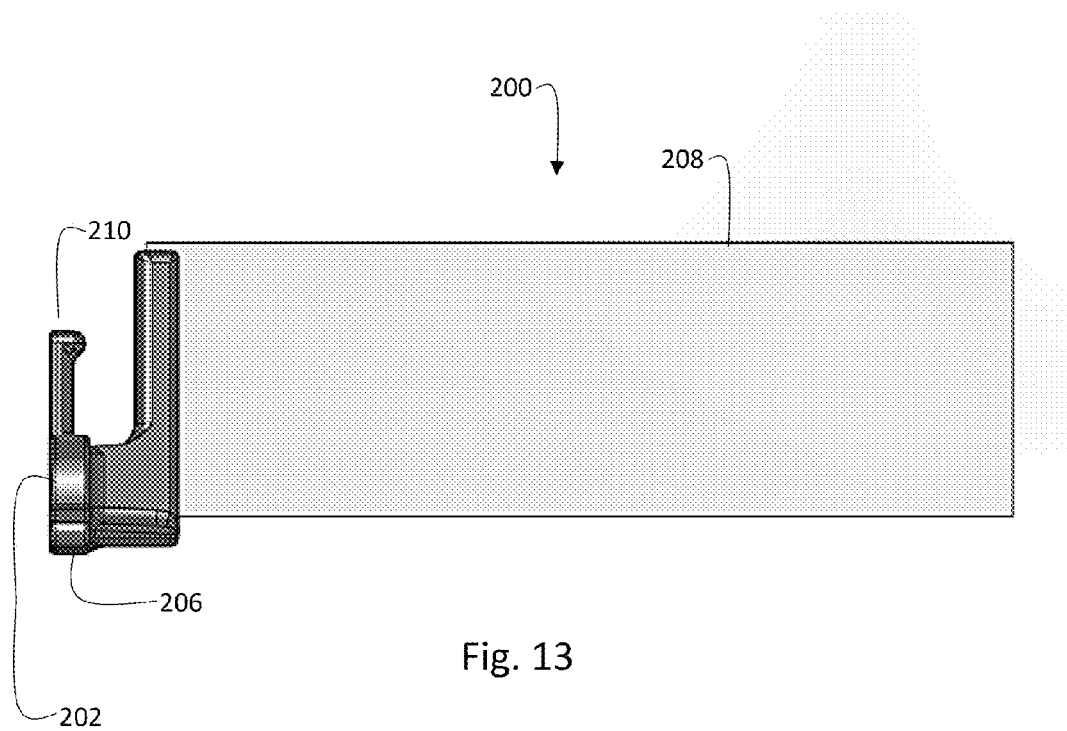
FIG. 13 shows a side view of the connector of FIG. 10.
Figure 14:
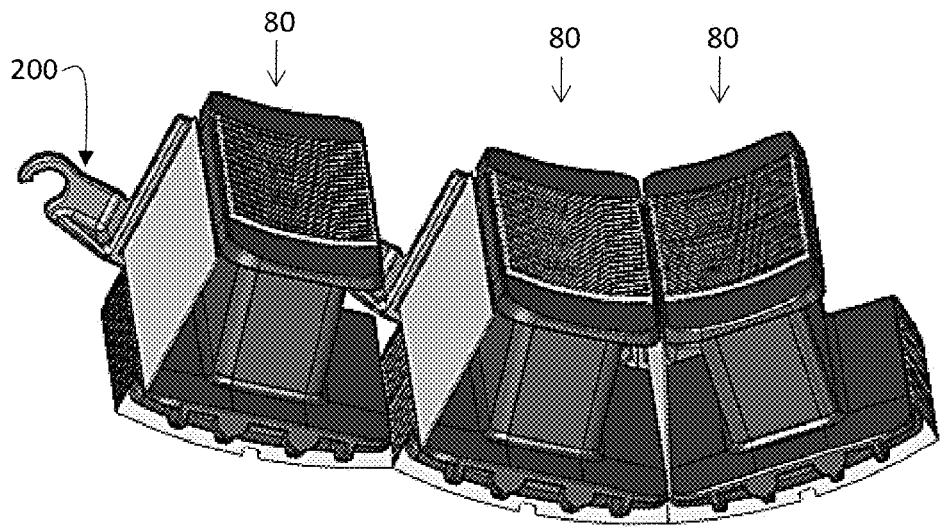
FIG. 14 shows an enlarged partial perspective view of a portion of a stator assembly with three adjacent segments coupled together with connectors of the type shown in FIG. 10.
Figure 15:
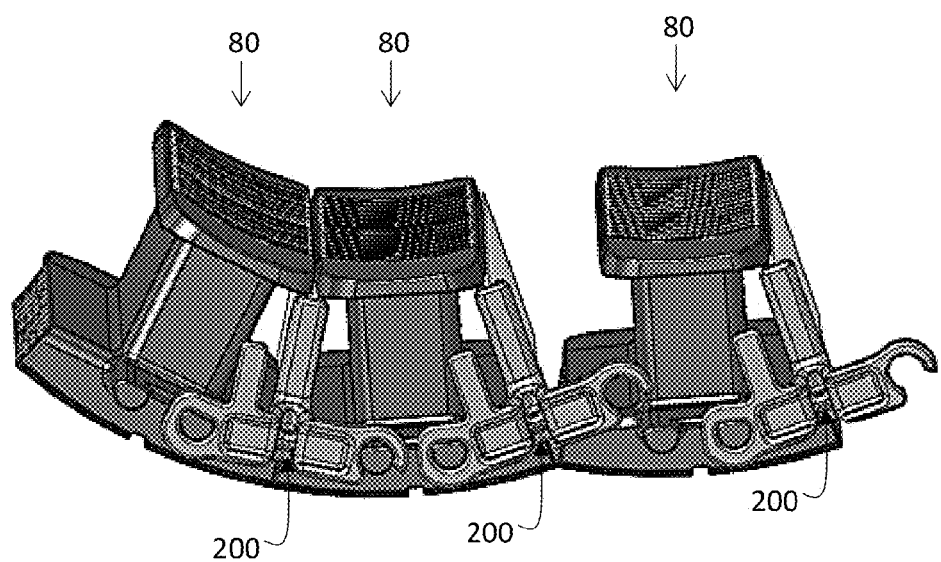
FIG. 15 shows an enlarged partial perspective view of a portion of a stator assembly with three adjacent segments coupled together with connectors of the type shown in FIG. 10.

The segmented stator assembly 50 is typically contained within a motor shell (not shown), and a rotor (not shown) and shaft (not shown) are positioned for rotation within a bore of the stator. The segmented stator assembly includes a plurality of discrete stator segments such as those shown in FIGS. 5-9, 18-20, and 28-30. The stator segment comprises a plurality of like laminations as shown in FIGS. 2-4. The laminations are stacked side-by-side to form the segment. Using a connector as shown FIGS. 10-13, 21-24, and 31-32, adjacent segments may be coupled together, for instance, as shown in FIGS. 1, 14-17, 25-27, and 33-34 to form the segmented stator assembly. The adjacent segments may be wound as shown in FIGS. 1, 16, 17, and 35.

Each of the segments comprises a plurality of laminations 60 arranged side by side to form a lamination stack with axially opposite sides. The laminated stack may be formed from a plurality of substantially identical laminations. Referring to FIGS. 2-4, each of the laminations in the stack has a yoke portion 62 with opposite ends 64,66 and a tooth portion 68 extending generally transverse to the yoke portion. The tooth portion 68 is generally disposed between the opposite ends 64,66 of the yoke portion. The tooth portion 68 has a pole end, which is generally "T" shaped. The laminations are made of stamped steel and stacked together to form the segment. In forming the stack, each lamination may have a plurality of cooperating tabs 70 and detents 72 defined in the yoke portion 62 and tooth portion 68. The tabs 70 and detents 72 of adjacent laminations interfit with one another when the laminations are stacked to inhibit relative movement of the adjacent laminations. The tabs and detents may be formed simultaneously in a stamping operation when forming the lamination, such that the portion of the yoke and/tooth portion punched through and extending from the back of the lamination comprises the tab 70 and the depression in the front of the lamination comprises the detent 72. Although the drawings show interlocking laminations, the laminations may be stacked and held together with a weld or adhesive, or held in a stack with the insulating material described below.

Once the laminations are stacked together, the stack may be processed in injection mold operations. In the injection mold operations, the segments may have overmolded insulating material applied. The overmolded insulating material may be applied to at least one axial side of the lamination stack. Given the geometry of the like laminations when formed into the stack, the segment may be considered to have a yoke portion and a tooth portion. The overmolded insulating material of the axial side may cover at least a part of the yoke portion and the tooth portion of an axially outermost lamination of the lamination stack. In effect the overmolded insulating material may form an end cap for each segment.

The overmolded insulating material is preferably formed around the stack in a way that assists in winding operations. For instance, the overmolded insulation material that forms the outboard face of the pole end (i.e., the surface of the pole end facing the yoke portion) at least partially helps to position and retain the winding coil in a desired position on the tooth portion. For reference, the inboard face of the pole end of the tooth portion (i.e., the surface of the pole end facing away from the yoke portion) forms the bore of the assembled stator within which the rotor is positioned for rotation. Further detail of the segments is described below. It should be appreciated that the following is intended to exemplary and not limiting in any sense. Accordingly, a segment may have one or more of the features described below. Additionally, in describing corresponding features among the different embodiments, the same reference characters will be used.

FIGS. 5-9 show one exemplary embodiment of a segment 80 used to form a stator assembly. The segment may have a first axial end 82 and a second axial 84 and opposite the first axial end. The overmolded insulating material may be disposed across the yoke portions 86 and tooth portions 88 of the stack thereby covering the yoke and tooth portions (FIGS. 2-4, "62", "68") of the axially outermost laminations of the lamination stack. The over molded insulating material may extend around the tooth portion and the underside of yoke portion of the stack, but need not extend around the outer diameter surfaces and opposite ends of the yoke portion of the laminations. The overmolded insulation may extend outward axially and circumferentially about the pole face 90 to assist in winding.

The first axial end of the segment may be formed with first and second posts 92,94 generally in the midsection of the first axial end of the stack in the area where insulating material covering the yoke portion of the stack adjoins the insulating material covering the tooth portion of the stack. The posts 92,94 may be centered relative to a radial centerline of the segment. Each post extends axially outward and may have a diameter dimensioned to correspond with the outer surfaces of the tooth portion of the stack and the underside of the yoke portion of the stack so that the wire wrapped around the post may extend seamlessly along the lateral sides of the tooth portion of the stack. The overmolded insulating material that forms the posts and covers the lateral sides of the tooth portion may be controlled and dimensioned to create a seamless transition from the post to the lateral side of the tooth portion. On the second axial side 84, the overmolded insulating material may form an end cap for the segment.

Figure 18:
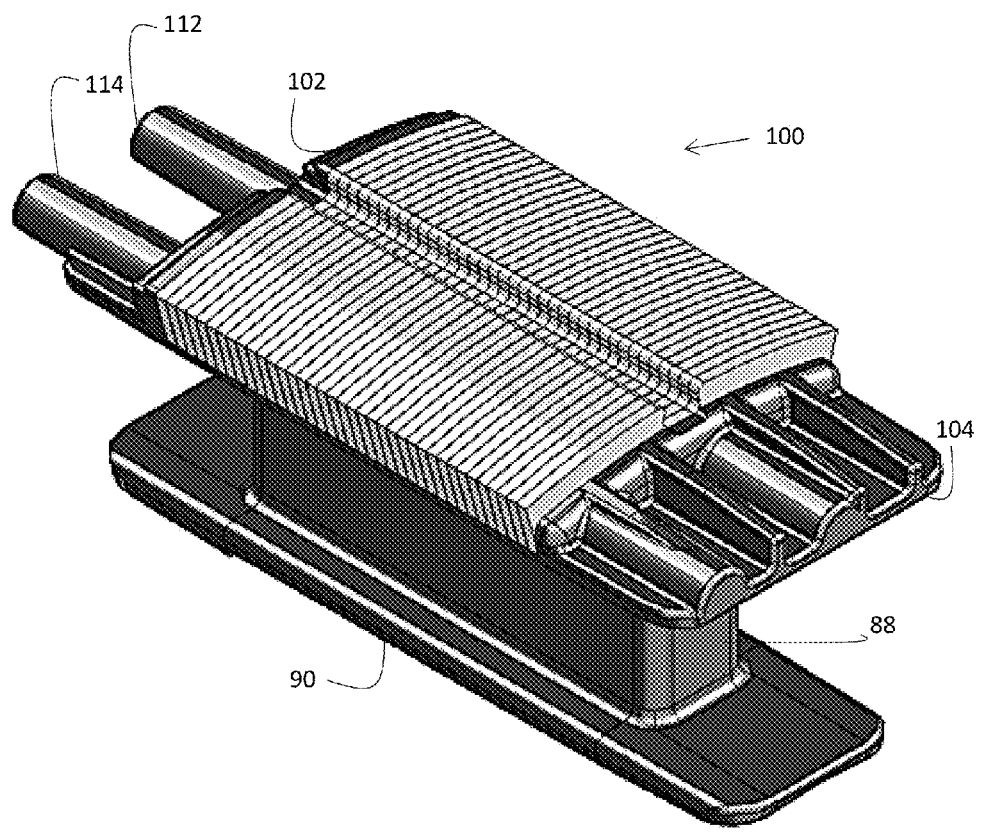
FIG. 18 shows a perspective view of an alternate embodiment of a stator segment that may be used to form a stator.
Figure 19:
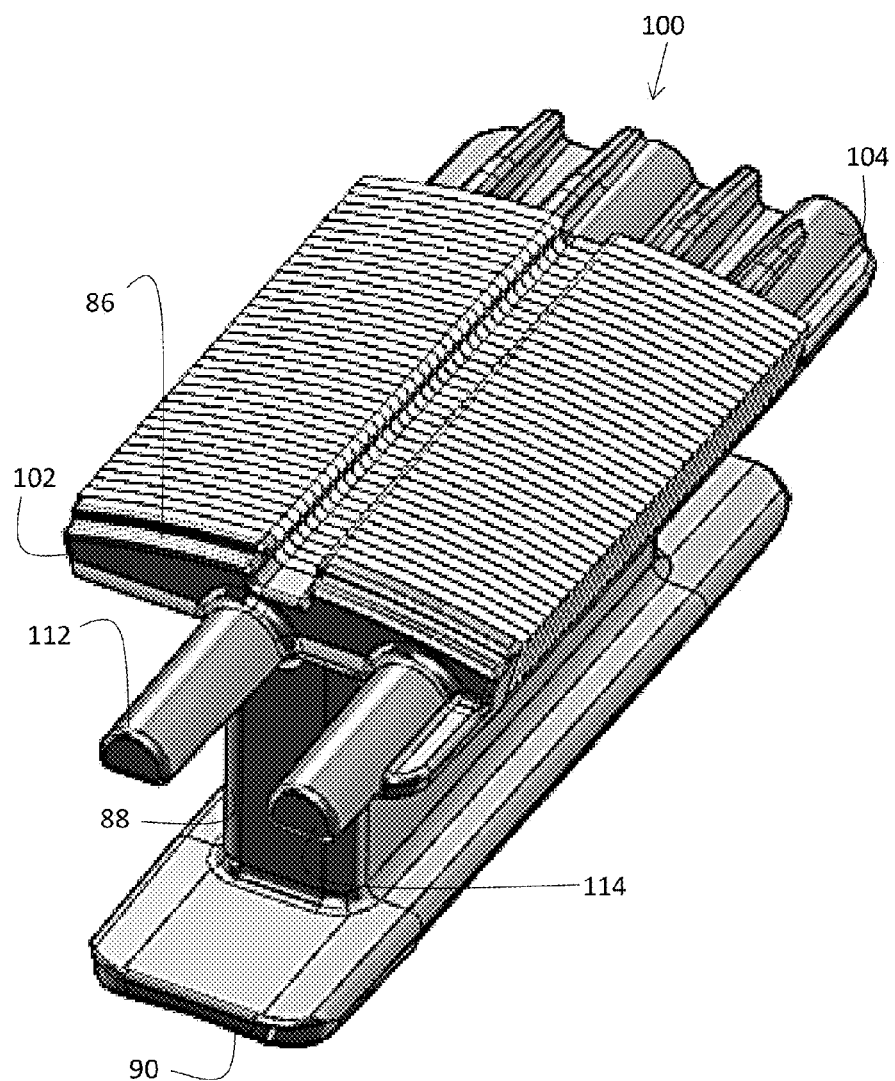
FIG. 19 shows an alternate perspective view of the stator segment of FIG. 18.
Figure 20:
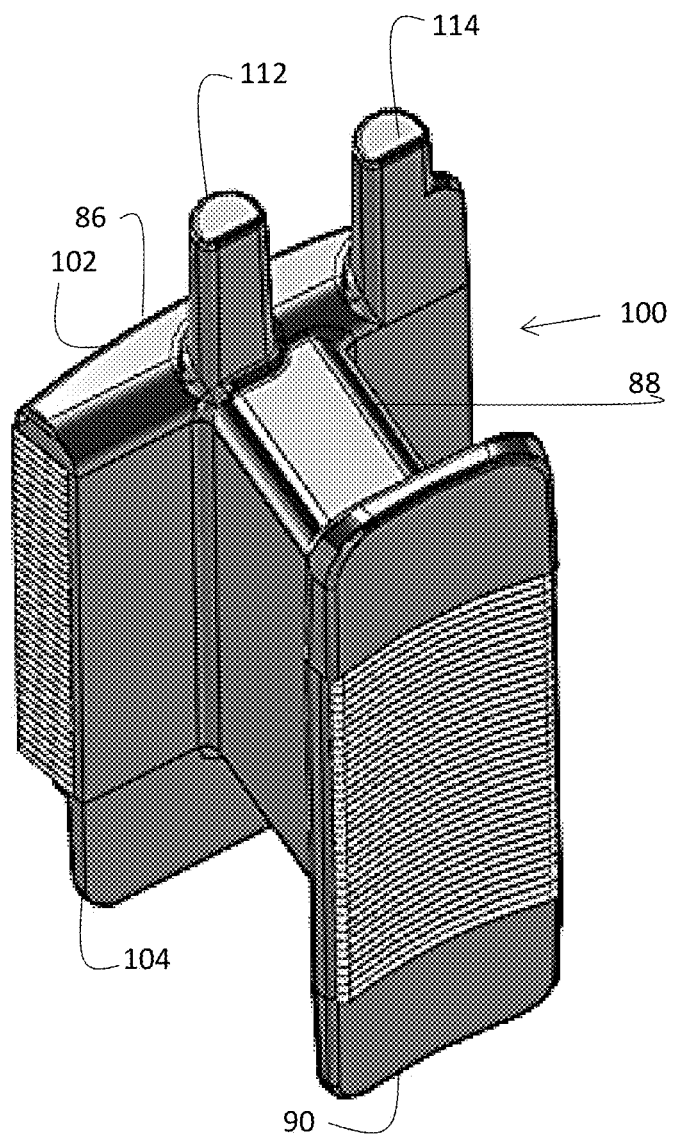
FIG. 20 shows an alternate perspective view of the stator segment of FIG. 18.
Figure 21:
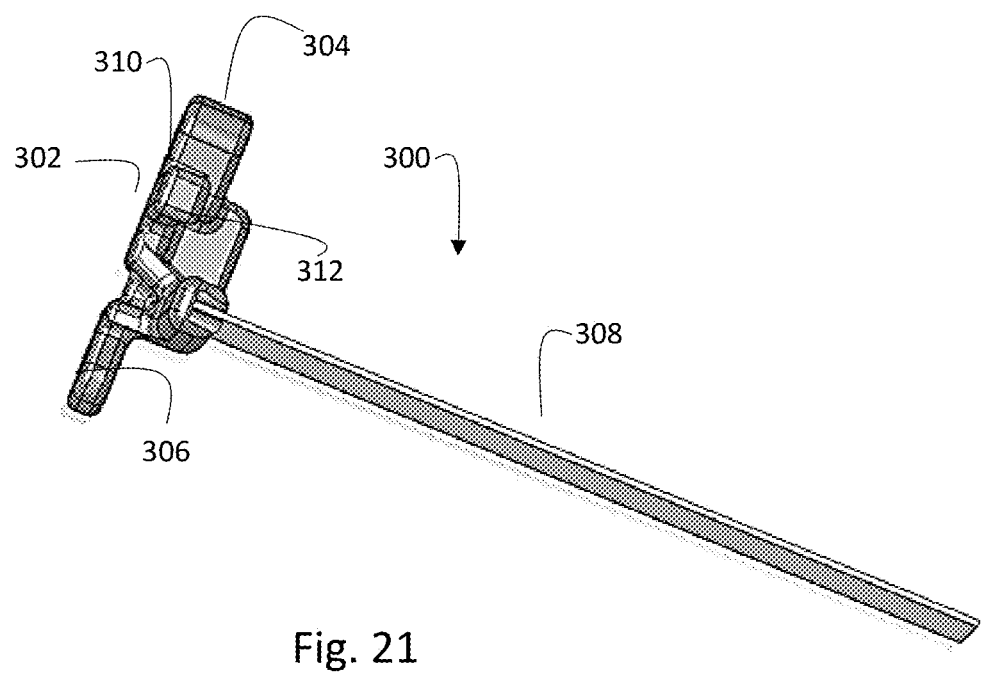
FIG. 21 shows a perspective view of an alternate embodiment of a connector that may used, for instance, to connect like segments of the embodiment shown in FIG. 18.
Figure 22:
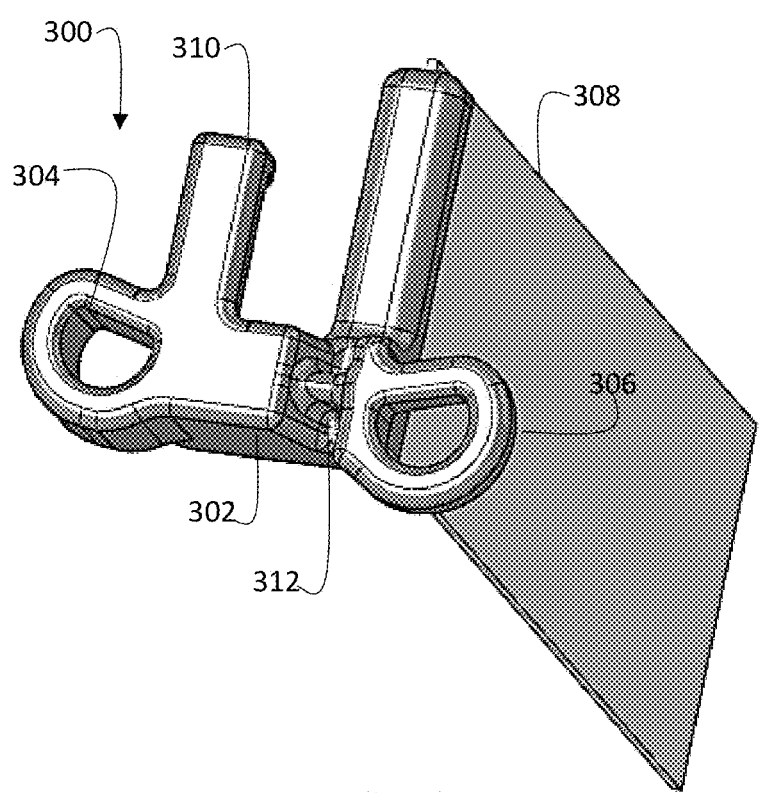
FIG. 22 shows an alternate perspective view of the connector of FIG. 21.
Figure 23:
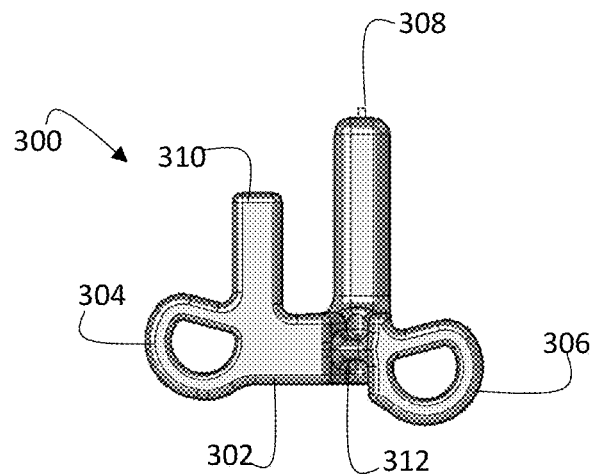
FIG. 23 shows an axial end view of the connector of FIG. 21.
Figure 24:
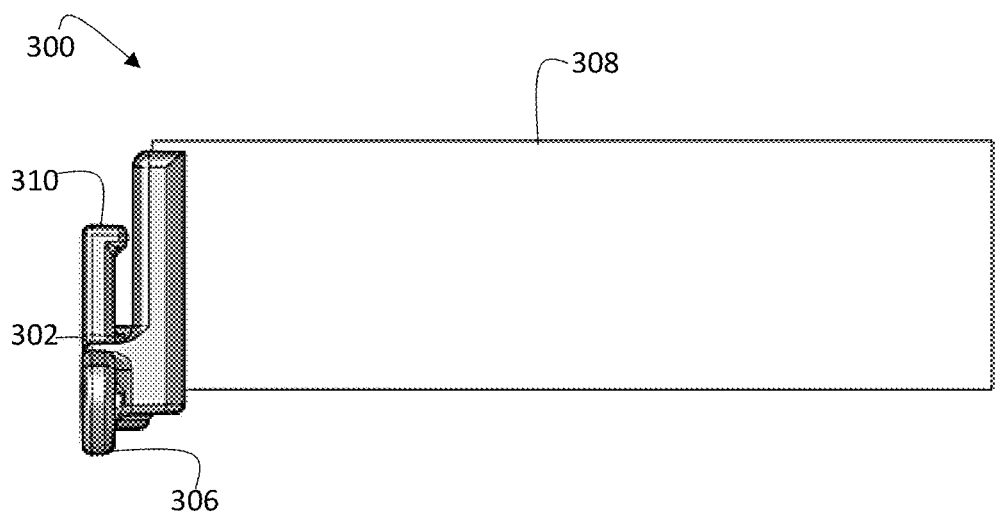
FIG. 24 shows a side view of the connector of FIG. 21.
Figure 25:
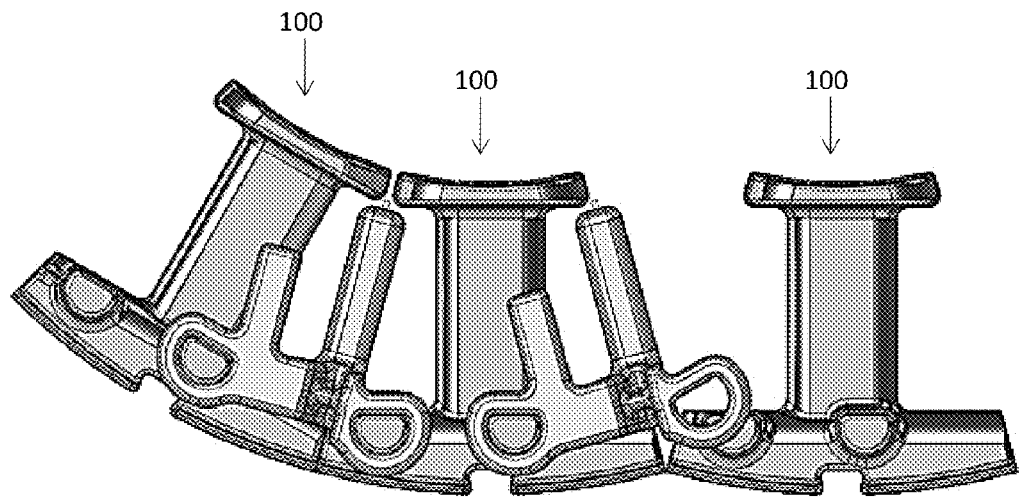
FIG. 25 shows an enlarged axial end view of a portion of a stator assembly with three adjacent segments of the embodiment of FIG. 18 coupled together with connectors of the type shown in FIG. 21.
Figure 26:
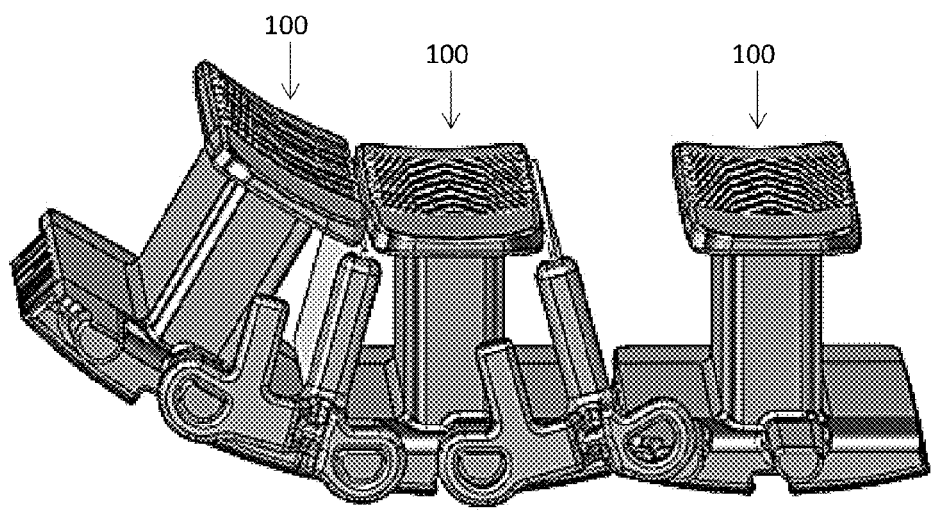
FIG. 26 shows an enlarged perspective view of a portion of a stator assembly with three adjacent segments of the embodiment of FIG. 18 coupled together with connectors of the type shown in FIG. 21.
Figure 27:
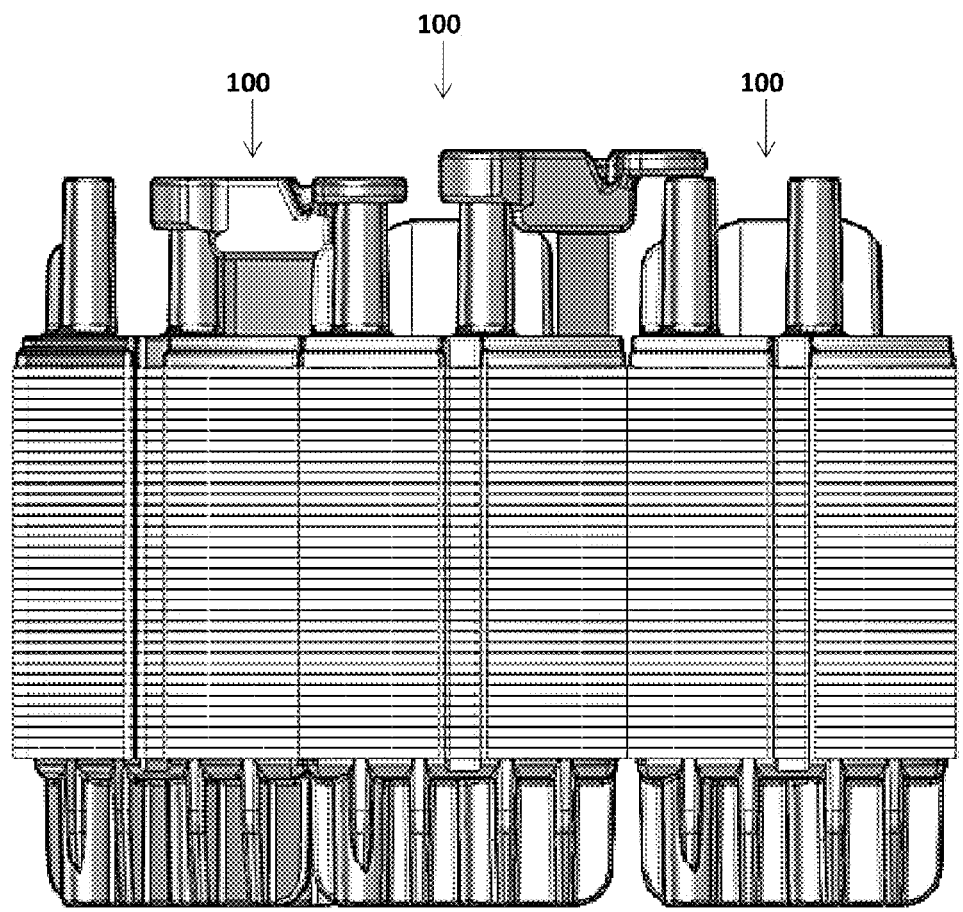
FIG. 27 shows an enlarged partial top view of a portion of a stator assembly with three adjacent segments of the embodiment of FIG. 18 coupled together with connectors of the type shown in FIG. 21.

FIGS. 18-20 show an alternate exemplary embodiment of the segment 100. In the alternate embodiments, the first axial end 102 of the status segment has overmolded insulating material which forms posts 112,114 that are offset from a radial centerline of the segment. In embodiment of FIGS. 18-21, the first post 112 is arranged at the corner of the tooth portion and underside of the yoke at the midsection of the first axial end of the stack in the area where insulating material covering the yoke portion of the stack adjoins the insulating material covering the tooth portion of the stack. The second post 114 is arranged adjacent to the opposite end of the yoke portion of the stack. In the embodiments of FIGS. 18-20, the second axial end 104 has overmolded insulating material which forms an end cap for the segment similar to the embodiment of FIGS. 5-9.

Figure 28:
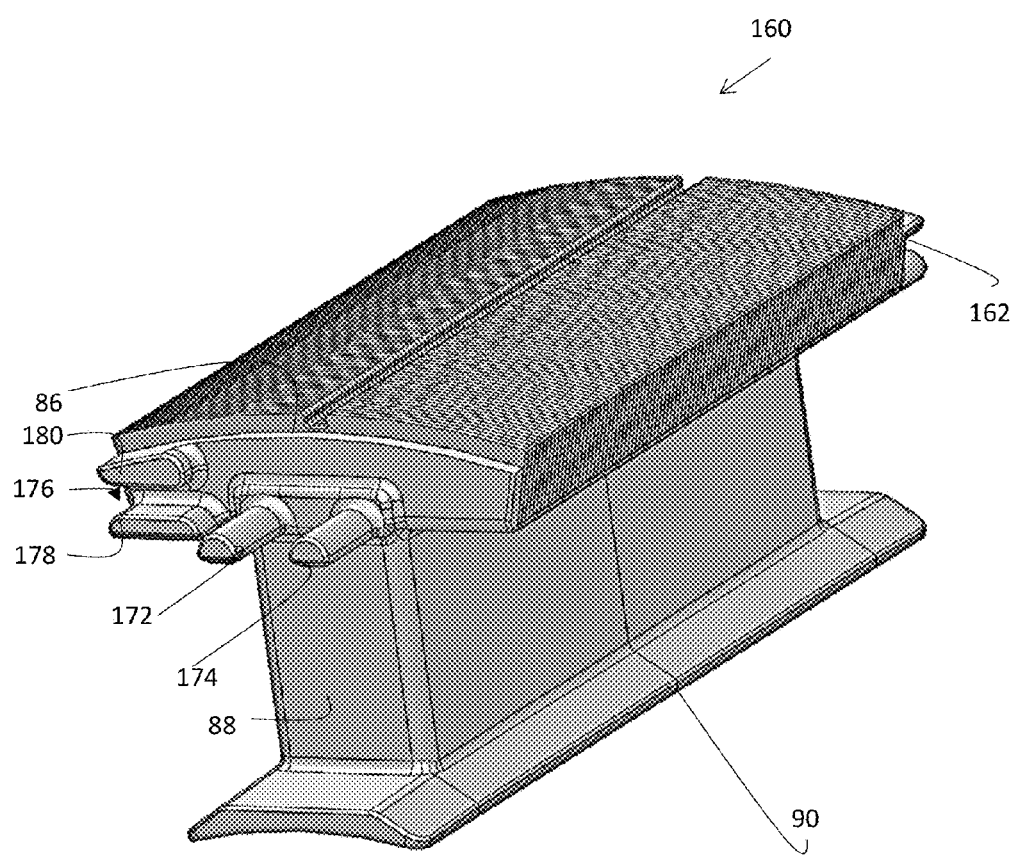
FIG. 28 shows a perspective view of an alternate embodiment of a stator segment.
Figure 29:
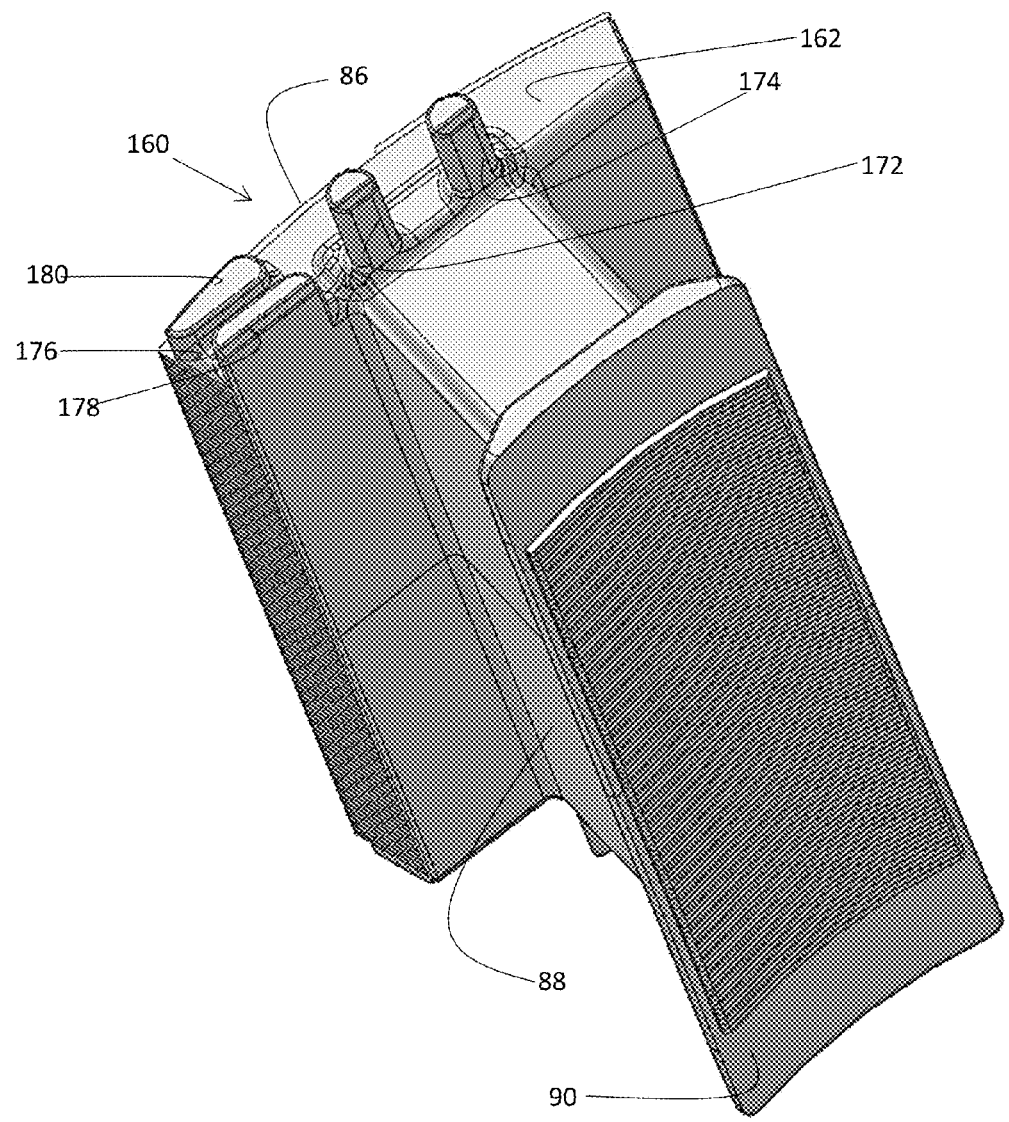
FIG. 29 shows an alternate perspective view of the stator segment of FIG. 28.
Figure 30:
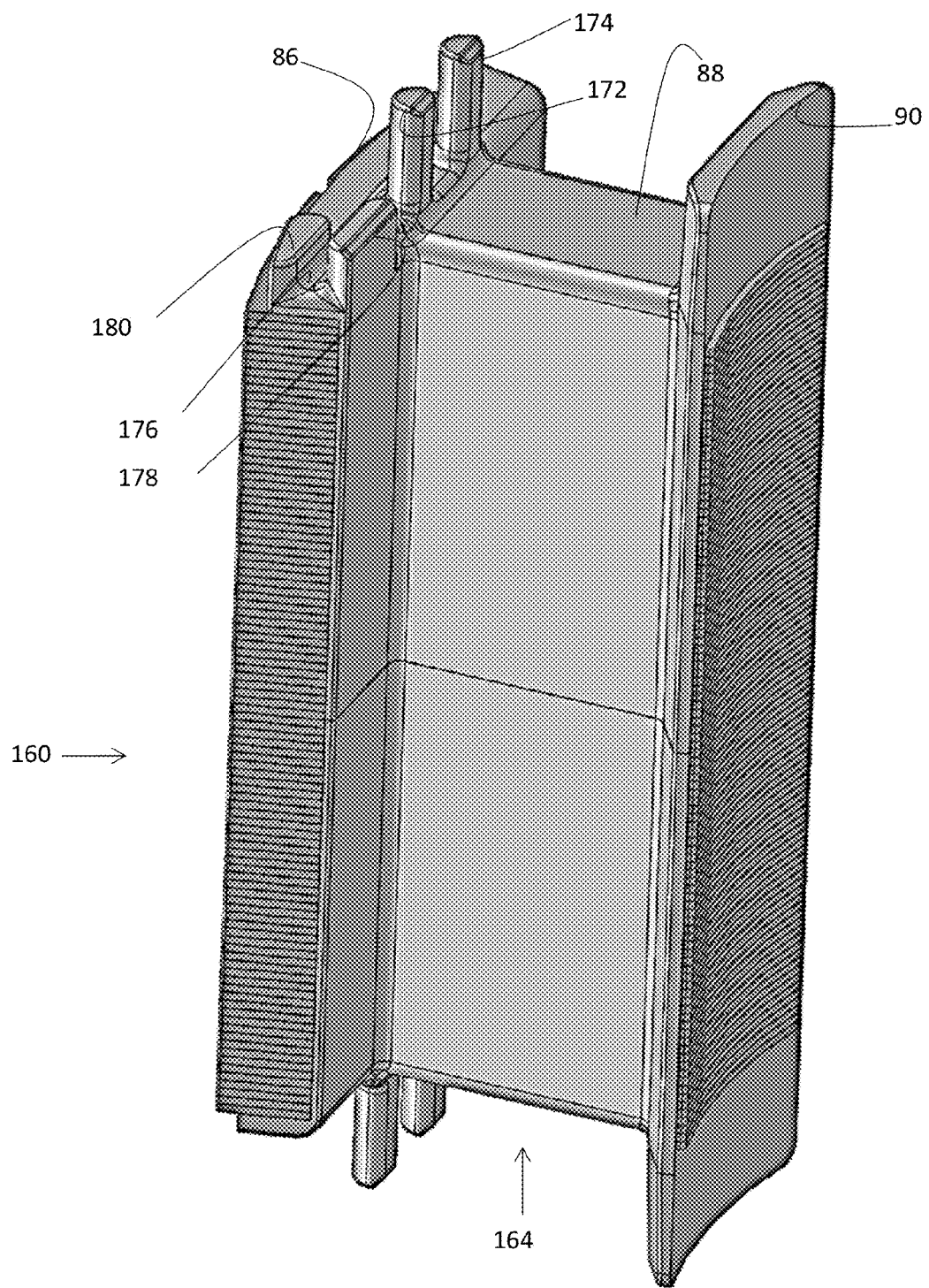
FIG. 30 shows an alternate perspective view of the stator segment of FIG. 28.

FIGS. 28-30 show another alternate exemplary embodiment of the segment 160. In the embodiment of FIGS. 28-30, the overmolded insulating material of the axial side 162 of the lamination stack also forms posts 172,174 on the axial end for wire to be wound about the tooth portion of the lamination stack. The first and second posts 172,174 are generally in a midsection of the axial end of the lamination stack where the yoke portion 86 of the stack adjoins the tooth portion 88 of the stack. Each post 172,174 extends axially outward and maybe positioned adjacent the yoke, so that the wire may fit around the post and extend along the lateral side of the tooth portion of the stack. A conduit 176 may be formed at one of the yoke portion opposite ends to guide windings into and out of the segment. Alternatively, conduits may be provided at each end of the yoke portion at both opposite ends of each segment. Depending upon the arrangement (i.e., one conduit or two conduits), the posts and the conduits may define a wire entry and exit path for wire wound around the stack. The wire exit path directs wire to the next lamination stack to be wound. The wire entry path may be separated from the wire exit path. The conduits 176 may have inner and outer tabs 178,180 that define the conduit. The inner tab 178 (closest to the inner diameter) and outer tab 180 (closest to the outer diameter) may have an axial height that varies to facilitate winding. For instance, the inner tab may have an axially height greater than the outer tab. The tabs may be equal height. On the opposite axial side 164, a like arrangement of posts may be provided. Winding of the segments will be described below.

After the segments are individually wound, the individually wound segments are assembled into a generally annular configuration to form the stator. The segments are coupled together with a connector 90 that interconnects or substantially holds the individually wound stator segments together. The connectors may be applied by hand or by automation to the segments to couple the segments together.

FIGS. 10-13 show one exemplary embodiment of a connector 200. The connector 200 comprises a bridge portion 202 that is removably attachable to the post of a segment and the post of an adjacent segment. The bridge portion 202 may be provided with a slot 204 and a hole 206 to enable the connector to releasably attach to the posts of adjacent segments to form the segments into an annular stator core. The posts have a geometry that cooperates with the connector slot 204 and the connector hole 206 to hold adjacent segments together in the necessary configuration and alignment relative to other stator segments to form a round stator core with round center bore for the rotor. The connector has an insulator portion 208 projecting from the bridge portion 202 that is disposed between the windings of adjacent segments when the connector is installed on the posts of adjacent segments. The insulator portion 208 extends between adjacent segments when the connector is removably attached to adjacent segments to insulate windings in adjacent segments.

In the embodiment of the connector shown in FIGS. 10-13, a lead wire retaining tab 210 is provided. Lead wires connecting the phases of the stator may be arranged under the lead wire retaining tab 210 to facilitate final potting operating and manufacture of the stator. Additionally, in embodiment of the connector of FIGS. 10-13, a wire conduit 212 is provided in the bridge to facilitate lead wire connection after winding is complete. As will be explained below in reference to FIGS. 16-17, the wire conduit of the bridge of the connector may serve as a wire entry point for the right adjacent segment after winding operations are complete and lead wire connections are made.

FIGS. 21-24 show an exemplary alternate embodiment of the connector 300 where the insulator portion 308 extends from the bridge portion 302 in an offset manner relative to the radial centerline of the connector, similar to the manner in which the posts 112,114 of the embodiment of the segment of FIGS. 18-20 is arranged. For purposes of contrasting the embodiments, the tooth portion of the stack of the embodiment of the segment of FIGS. 5-9 is relatively wider in dimension than the tooth portion of the embodiment of the segment of FIGS. 18-20. Consequently, in the embodiment of the segment of FIGS. 5-9, the posts 92,94 may be positioned at the corners of the tooth portion of the stack and the underside of the yoke portion of the stack, and the connector 200 connected to the first post 92 may not interfere with a connector connected to the second post 94. In the embodiment of the segment of FIGS. 18-20, because the tooth portion of the stack has less width, arranging the posts at the corners of the tooth portion of the stack and the underside of the yoke portion of the stack would cause the posts 112,114 to be in close proximity to one another, thereby creating a potential interference of a connector 300 connected to the first post with a connector connected to the second post. Accordingly, the second post 114 is moved laterally to an end portion of the yoke of the stack, thereby allowing a connector connected to the first post to not interfere with a connector connected to the second post. Accordingly, in the embodiment of the connector of FIGS. 21-24, the insulator portion 308 extends from the bridge in an offset manner. Additionally in the embodiment of the connector of FIGS. 21-24, the bridge portion is provided with attachment holes 304,306 rather than the hole 206 and the slot 204 as in the embodiment of the connector of FIGS. 10-13. A slot could also be provided. The connector 300 is also provided with the lead wire retaining tab 310 and the wire conduit 312.

Figure 31:
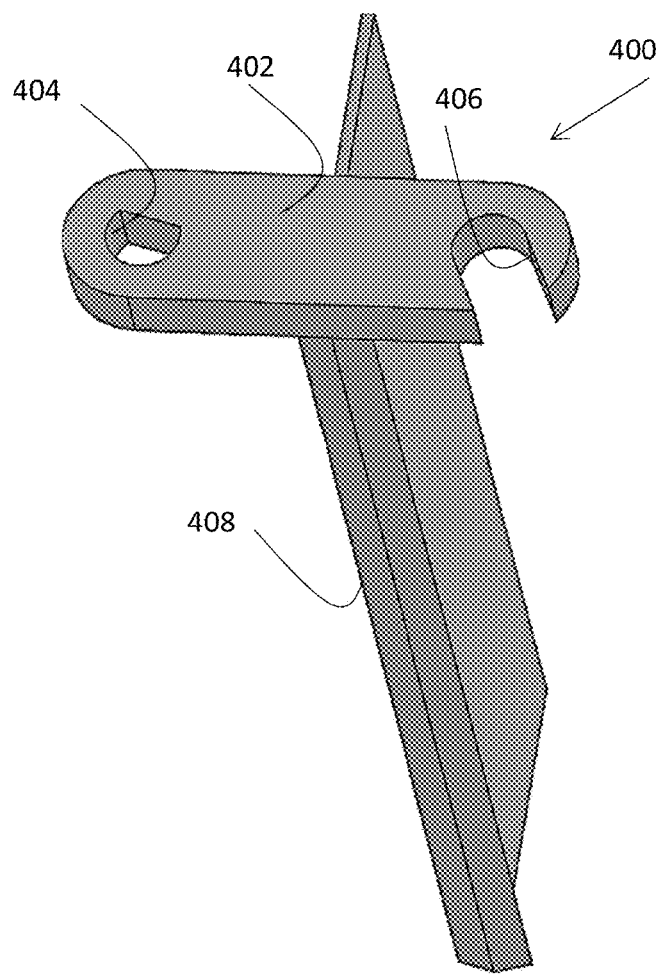
FIG. 31 shows a perspective view of an alternate embodiment of a connector that may be used, for instance, to connect like segments of the embodiment shown in FIG. 28.
Figure 32:
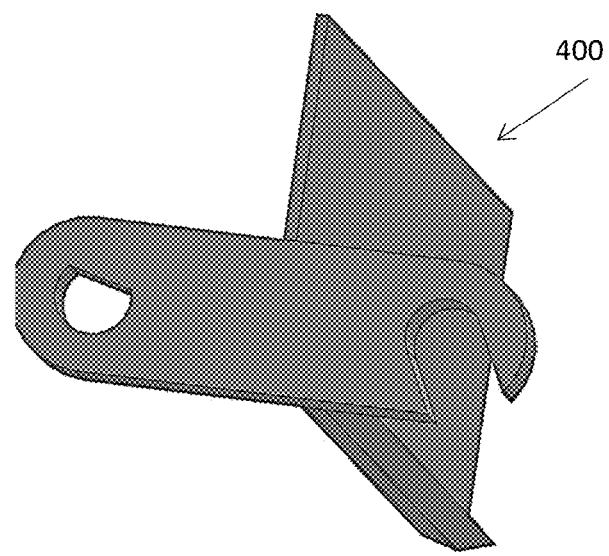
FIG. 32 shows an alternate perspective view of the connector of FIG. 31.
Figure 33:
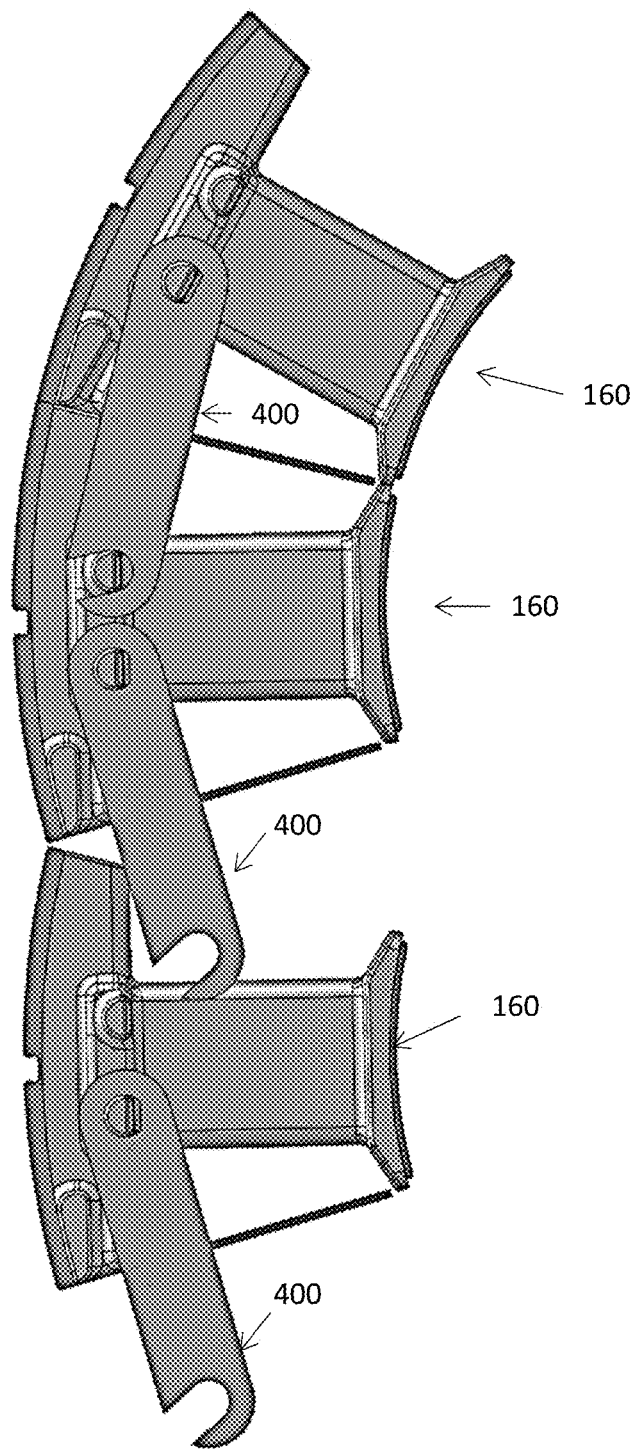
FIG. 33 shows an enlarged partial axial end view of a portion of a stator assembly with three adjacent segments of the embodiment shown in FIG. 28 coupled together with the connector of FIG. 31.
Figure 34:
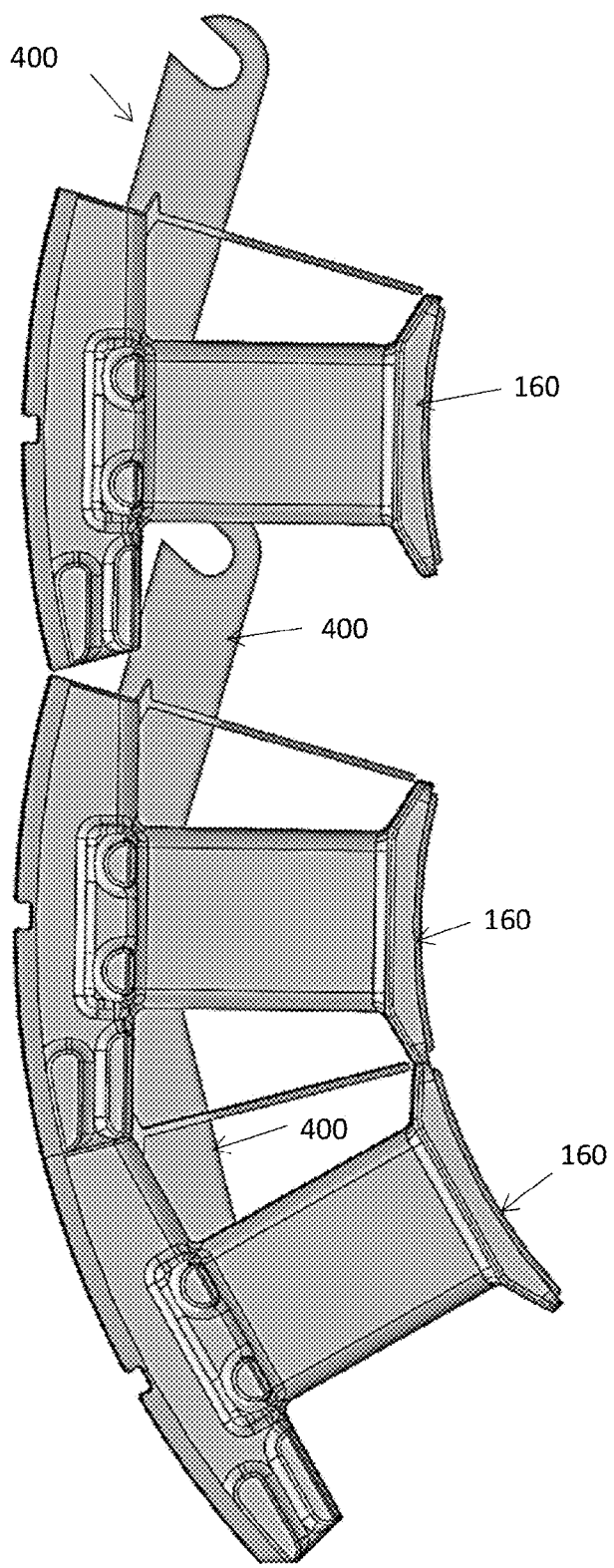
FIG. 34 shows an enlarged partial axial end view opposite that of FIG. 33.

FIGS. 31-32 show an alternate embodiment of the connector 40. The connector has the bridge portion 402 with a connector hole 404 and connector slot 406 with the insulating portion 408 extending from a radial centerline of the connector. However, in the embodiment of the connector of FIGS. 31-32, there is no wire guide of the type shown in the connectors of FIGS. 10-13 and 21-24. Because the embodiment of the connector of FIGS. 31-32 is used to connect segments with a wire guide and conduit formed on the axial ends of the yoke portion, the connector of FIGS. 31-32 need not utilize a wire guide or a lead wire retainer such as shown in the embodiments of the connectors of FIG. 10-13 or 21-24.

The embodiment of the connector 400 of FIGS. 31-32 may be placed on both axial ends of the segments. In this configuration, the insulator portion 408 of each connector may extend partially along the axial length of the segment so that the distal ends of the insulator portions are in close proximity, overlap, or abut to separate the windings of adjacent segments. Alternatively, the connector 400 may be used on one axial side of the segment and may have an insulator portion dimensioned to extend the entire axial length of the segment, so that the connector used on the opposite axial side of the segment need not have an insulator portion.

In each of the embodiments a plurality of like connector is used to assemble and insulate the stator is reduced. This reduces variation in the insulation and assembly, and further dispenses with the need to fixture or hold the stator together with a ring during installation of the frame. By providing the insulator portion on the bridge, the insulation is set in the proper location in a repeatable method that reduces variation. The insulator portion may be placed between the poles before the stator is formed into a circle. The stator may also be wound in a flat configuration and/or each stator segment may be wound individually. After winding the segments, the stator assembly may be rolled as necessary. Insulation may be in placed into position before completing the stator outer diameter.

Figure 16:
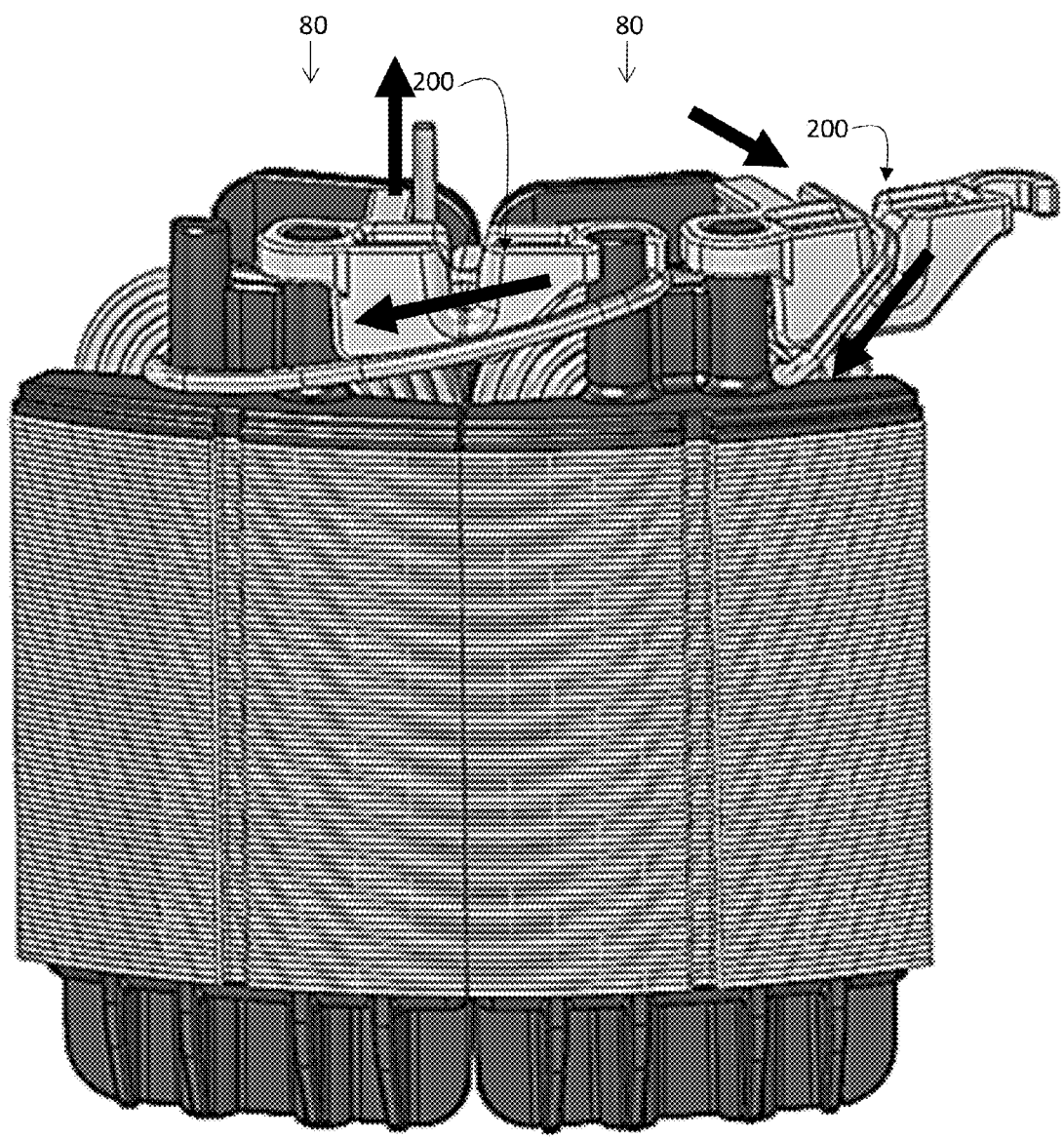
FIG. 16 shows an enlarged side top view of two adjacent stator segments wound with wire with the connector in place to show the wire winding pattern between adjacent segments.
Figure 17:
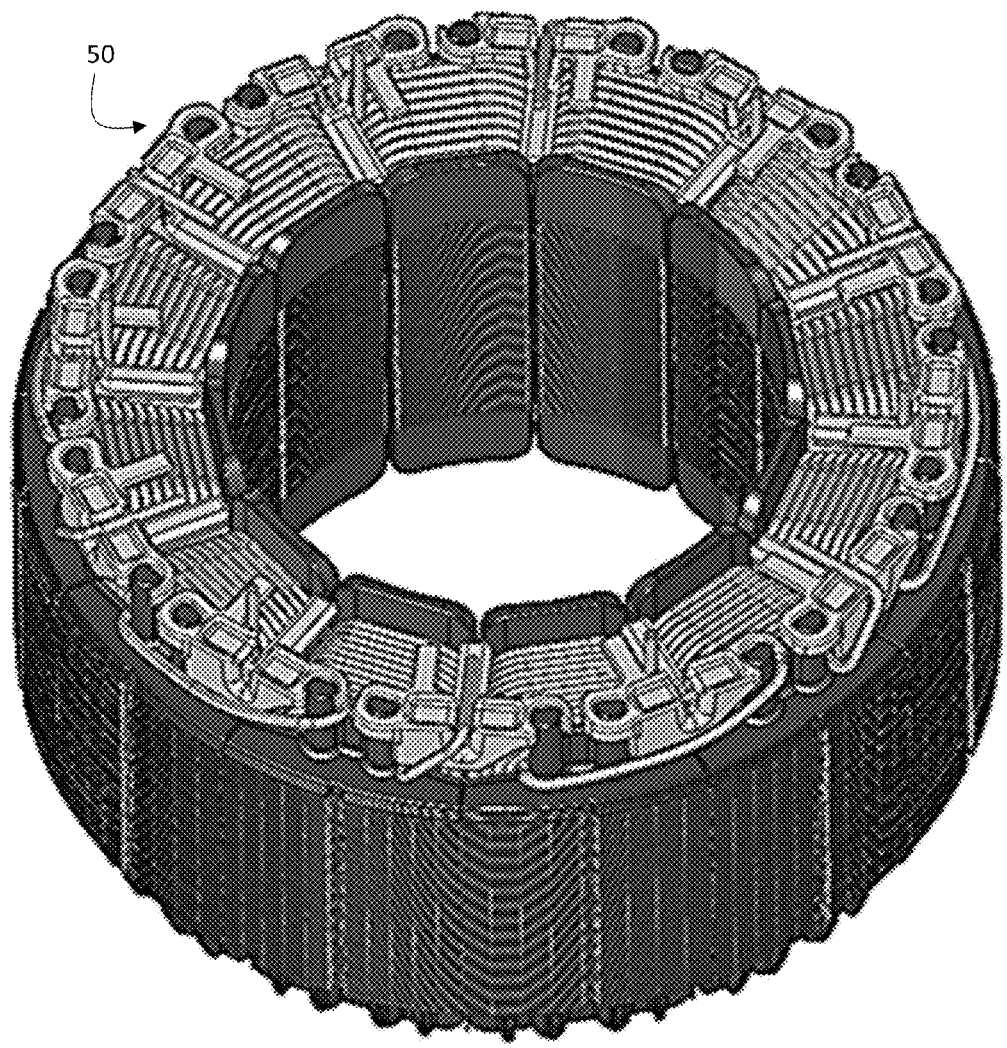
FIG. 17 shows a perspective view of the stator wound with wire with the connectors in place between adjacent segments to show the wire winding pattern between adjacent segments.

FIGS. 16 and 17 provide an example of wire patterns used for the segments shown in FIGS. 5-8, and the connectors shown in FIGS. 10-13. As mentioned above, the segment may be wound without the connector installed. Referring to FIGS. 16-17, a lead wire enters a two segment assembly adjacent the right post of the right segment (FIG. 16) across the yoke portion of the right lamination stack. After winding is complete, the connector may be installed on the post and the wire may be bent upwards and to the right in order to pass through the wire guide conduit formed on the bridge of the connector. During winding, the wire is directed axially adjacent the right post of the right segment and then is directed axially from the first axial end to the second axial adjacent to the lateral side of the tooth portion and the underside of the yoke portion. The wire is wound around the tooth portion in a clock-wise manner (relative to FIG. 16) until winding of the right segment is complete at which point the wire is directed around the left post of the right segment in the direction between the first and second posts of the right segment, and then the wire is directed circumferentially to the left segment.

The wire is then directed to the left post of the left segment whereupon the wire is directed axially from the first axial end to the second axial end with the wire adjacent to the lateral side of the tooth portion and the underside of the yoke portion. Winding continues in a counterclockwise manner (relative to FIG. 16) until winding of the left segment is complete whereupon the wire exits the left segment on a radial inner diameter surface of the connector.

The segments may then be formed into an annular configuration as that shown in FIGS. 1 and 17 using the connectors. Lead wires may then be connected to each segment grouping in accordance with the phases and number of poles of the machine. A potting material may then be disposed on each axial end to insulate the windings and the lead wires. The segments shown in FIGS. 18-20 and 25-27 maybe wound in a similar manner.

Figure 35:
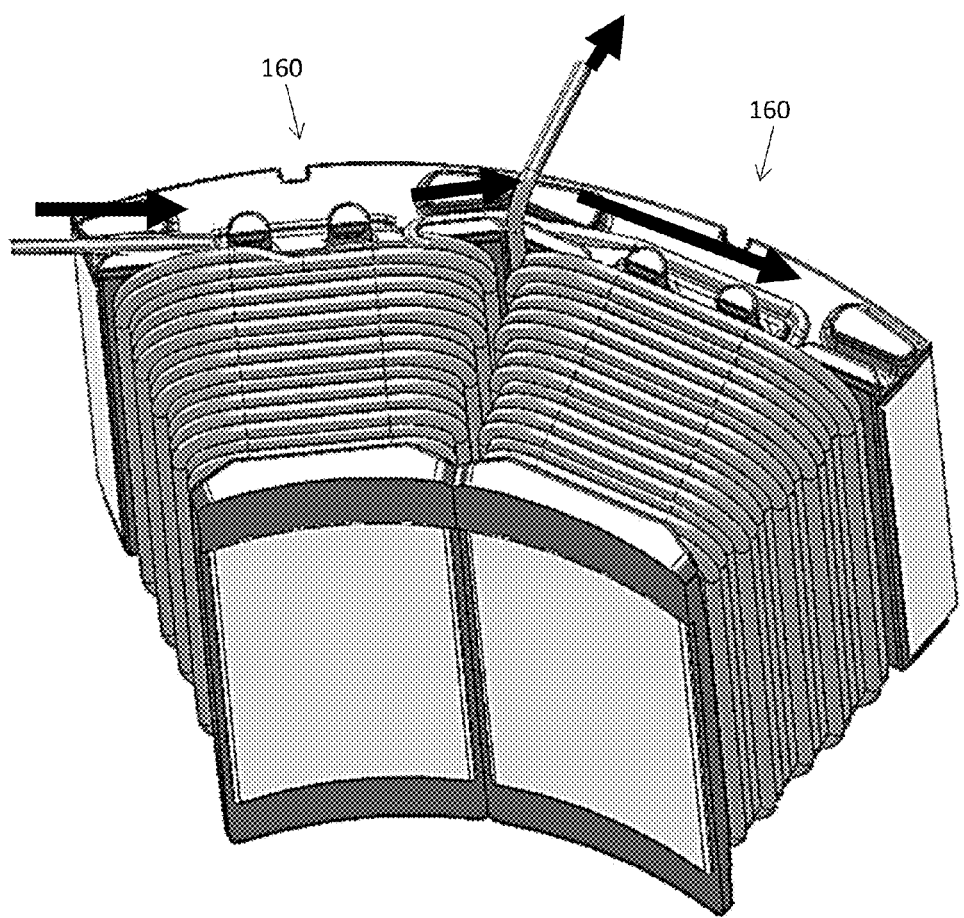
FIG. 35 shows a perspective view of an alternate embodiment of adjacent stator segments wound with wire with a connector removed to show the wire winding pattern between adjacent segments.

FIG. 35 provides another example of forming a concentrated winding of the segment shown in FIGS. 28-30. Wire comprising the concentrated winding begins a wire entry path through the conduit at the left side of the left segment. The wire then is directed from the conduit between the inner tab and the post along the lateral side of the tooth portion of the overmolded left segment. The wire is continually wound around the left segment until a concentrated winding is formed in the left segment. The wire exit path comprises the post and the conduit on the right side of the left segment. The wire extends between the post and the inner tab and then into right side conduit. The wire entry path for the adjacent right segment comprises a left side conduit of the adjacent right segment. The wire extends across the yoke portion of the right segment and is directed between the inner tab of the right side conduit and the post of the adjacent right segment. The wire then proceeds along the lateral side of the tooth portion of the adjacent right segment and the segment is wound. When the segment is wound, the wire exit path for the right segment includes an underside surface of the yoke portion adjacent to the left conduit of the right segment. Wire extends axially outward from the underside surface of the yoke portion adjacent to the left conduit of the right segment. The wire may then be sleeved with insulation and connected with another segment set in the same phase via a connector attached to the exit wire. The system of left and right conduits and posts provides various alternatives for wire winding depending upon the size of the segment and number of windings need for a desire concentrated wire winding.

In view of the foregoing, it will be seen that the several advantages are achieved and attained. The embodiments were chosen and described in order to best explain a practical application to thereby enable others skilled in the art to best utilize the principles herein in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A stator for an electrodynamic machine having a plurality of segments and a plurality of connectors that are members separate from the segments, each of the separate connectors being releasably attachable to and assemblable with two adjoining segments in a manner such that the adjoining segments are operatively connected sequentially next to one another with the connector in a ring shape to define a core for the stator, each of the segments comprising a plurality of laminations arranged side by side forming a lamination stack with axially opposite sides, the lamination stack having an end cap abutting an axial side of the lamination stack, the end cap having first and second posts extending axially outward from the end cap, at least one of the posts defining a wire path for wire wound around the stack, each of the connectors comprising a bridge portion, the bridge portion having openings dimensioned to receive the posts of the two adjoining segments in a manner such that the connector is removably attachable to and assemblable with the post of the end cap of a segment and the post of the end cap of the adjoining segment of the stator assembly, the connector having an insulator portion projecting from the bridge portion, the insulator portion extending between the adjoining segments with the connector assembled with and removably attached to the adjoining segments.

2. The stator of claim 1, wherein the end cap comprises insulating material overmolded around the lamination stack.

3. The stator of claim 1, wherein the insulating material covers a majority of the lamination stack.

4. The stator of claim 1, further comprising a second end cap disposed on an axially opposite side of the lamination stack.

5. The stator of claim 4, wherein the first and second end caps comprise insulating material overmolded around the lamination stack.

6. The stator of claim 5, wherein the second end cap has first and second posts arranged as the opposite side end cap.

7. The stator of claim 6, further comprising a second connector including a bridge portion with openings dimensioned to receive the posts of the second end cap in a manner that the second connector is removably attachable to and assemblable with the post of the second end cap of a segment and the post of the second end cap of a adjoining segment.

8. The stator of claim 1, wherein the connector bridge insulator portion extends along an axial length of adjacent segments.

9. The stator of claim 1, wherein one of the connector openings comprises a slot.

10. The stator of claim 1, wherein the post and connector bridge portion opening have cooperating geometry which orients the segment relative to the stator such that the tooth portions of the laminations of the stack are radially aligned with a center axis of the stator.

11. The stator of claim 1, wherein the connector bridge portion has a conduit that together with at least one of the posts defines a wire path for wire wound around the stack.

12. A segment for the stator of claim 1.

13. The stator of claim 1 wherein the first and second end caps are identical.

14. The stator of claim 1 wherein each connector is removably attachable to and assemblable with the adjoining segments without relative axial movement of the adjoining segments.

15. An electrodynamic machine having a plurality of segments and a plurality of connectors that are members separate from the segments, each of the separate connectors being releasably attachable to and assemblable with two adjoining segments in a manner such that the adjoining segments are operatively connected sequentially next to one another with the connector in a ring shape to define a core for the stator, each of the segments comprising a plurality of laminations arranged side by side forming a lamination stack with axially opposite sides, each of the laminations in the stack having a yoke portion with opposite ends and a tooth portion extending generally transverse to the yoke portion, the tooth portion being generally disposed between the yoke portion opposite ends, the lamination stack having insulating material on an axial side covering at least a portion of the yoke portion and the tooth portion of an axially outermost lamination of the lamination stack, the insulating material of the axial side of the lamination stack forming first and second posts on an axial end of the lamination stack where the insulating material forming the posts is adjacent the yoke portion and the tooth portion of the axially outermost lamination of the lamination stack, each post extending axially outward, the connector comprising a bridge portion, the bridge portion having openings dimensioned to receive the posts of the two adjoining segments in a manner such that the connector is removably attachable to and assemblable with the post of a segment and the post of the adjoining segment, the connector having an insulator portion projecting from the bridge portion, the insulator portion extending between the adjoining segments with the connector is removably attached to the adjoining segments.

16. The stator of claim 15, wherein the connector bridge portion comprises a conduit for guiding wire wound around the segment.

17. The stator of claim 16, wherein the connector bridge portion conduit is formed in the center of the connector bridge portion.

18. The stator of claim 16, wherein the connector bridge portion conduit comprises a groove formed in the connector bridge portion.

19. The stator of claim 15, wherein one of the posts is disposed adjacent to an end of the yoke portion of the lamination stack.

20. The stator of claim 15, wherein the insulating material is overmolded around the lamination stack.

21. The stator of claim 15, wherein one of the connector openings comprises a slot.

22. The stator of claim 15, wherein the insulating material covers a majority of the lamination stack.

23. The stator of claim 15, wherein the post and connector bridge portion opening have cooperating geometry which orients the segment relative to the stator such that the tooth portions of the laminations of the stack are radially aligned with a center axis of the stator.

24. The stator of claim 15, wherein the connector insulator portion projects from a center of the connector bridge portion.

25. The stator of claim 15, wherein the connector bridge portion has a wire retainer tab extending radially therefrom.

26. The stator of claim 15, wherein the connector bridge insulator portion extends along an axial length of adjacent segments.

27. A segment for the stator of claim 15.

28. The stator of claim 15 wherein the insulating material on the axial sides of the lamination stack have a matching geometry.

29. The stator of claim 15 wherein the connector is releasably attachable to and assemblable with the adjoining segments without axial relative movement between the adjoining segments.

* * * * *